United States Patent
Kao et al.

(12) 
(10) Patent No.: US 6,651,168 B1
(45) Date of Patent: Nov. 18, 2003

(54) AUTHENTICATION FRAMEWORK FOR MULTIPLE AUTHENTICATION PROCESSES AND MECHANISMS

(75) Inventors: I-Lung Kao, Austin, TX (US); Ivan Matthew Milman, Austin, TX (US); David J. Schneider, Austin, TX (US); Ronald Gene Willard, Austin, TX (US)

(73) Assignee: International Business Machines, Corp., Armonk, NY (US)

( * ) Notice: Subject to any disclaimer, the term of this patent is extended or adjusted under 35 U.S.C. 154(b) by 0 days.

(21) Appl. No.: 09/240,492

(22) Filed: Jan. 29, 1999

(51) Int. Cl.⁷ ................................................ H04L 9/30

(52) U.S. Cl. ...................... 713/185; 713/182; 713/155

(58) Field of Search .......................... 713/155, 182–186; 380/25

(56) References Cited

U.S. PATENT DOCUMENTS

| | | | |
|---|---|---|---|
| 5,481,720 A | | 1/1996 | Loucks et al. |
| 5,544,322 A | | 8/1996 | Cheng et al. |
| 5,586,260 A | | 12/1996 | Hu |
| 5,617,570 A | | 4/1997 | Russell et al. |
| 5,620,079 A | * | 4/1997 | Molbak ...................... 194/217 |
| 5,684,950 A | | 11/1997 | Dare et al. |
| 5,706,427 A | | 1/1998 | Tabuki |
| 5,774,551 A | * | 6/1998 | Wu et al. ...................... 380/25 |
| 6,388,657 B1 | * | 5/2002 | Natoli ........................ 345/168 |

OTHER PUBLICATIONS

Computer Dictionary, 1997, Microsoft Press, 3rd ed., pp. 101 and 220.*
Product Standard, Common Data Security Architecture Smart Card Plug–In (URL http://www.opengroup.org/security/cdsa/ps–sc.pdf).

OpenCard—Opencard Framework 1.1 Programmer's Guide, (http://www.opencard.org/docs/pguide/PGuide.html#HDROCFARCHITECTURALCONCEPTS.

The Java Wallet Architecture White Paper, (http://java.sun.comproducts/commerce/docs/whitepapers/arch/architecture.pdf).

BioAPIWelcomes Contributors—http://www.ibm.com/security/html/pr_bio91198.html).

User Authentication Services (UAS) Specification Release 1.0—Version 1.0 Sep. 1998.

* cited by examiner

*Primary Examiner*—Gilberto Barrón
*Assistant Examiner*—Doug Meislahn
(74) *Attorney, Agent, or Firm*—Morgan & Finnegan, LLP; Joseph C. Redmond, Jr.

(57) ABSTRACT

An authentication framework subsystem enables a computer system to authenticate a user with a selected one of a plurality of authentication processes. Each of the authentication processes has a distinct sequence of steps and a unique input/output (I/O) interface for exchanging authentication information with the computer system. The invention includes an authentication framework in the computer system. An application program interface in the authentication framework provides an interface to an I/O component, such as a graphical user interface (GUI), of the computer system. A plurality of authentication modules interface with the framework. Each module has a conversation function driver defining a programmed sequence of steps to authenticate a user with a distinct authentication process. A conversation function in the application program interface, defines a programmed sequence of steps for controlling the I/O component in response to generic instructions that have the same format but different sequences for each of the authentication modules.

21 Claims, 23 Drawing Sheets

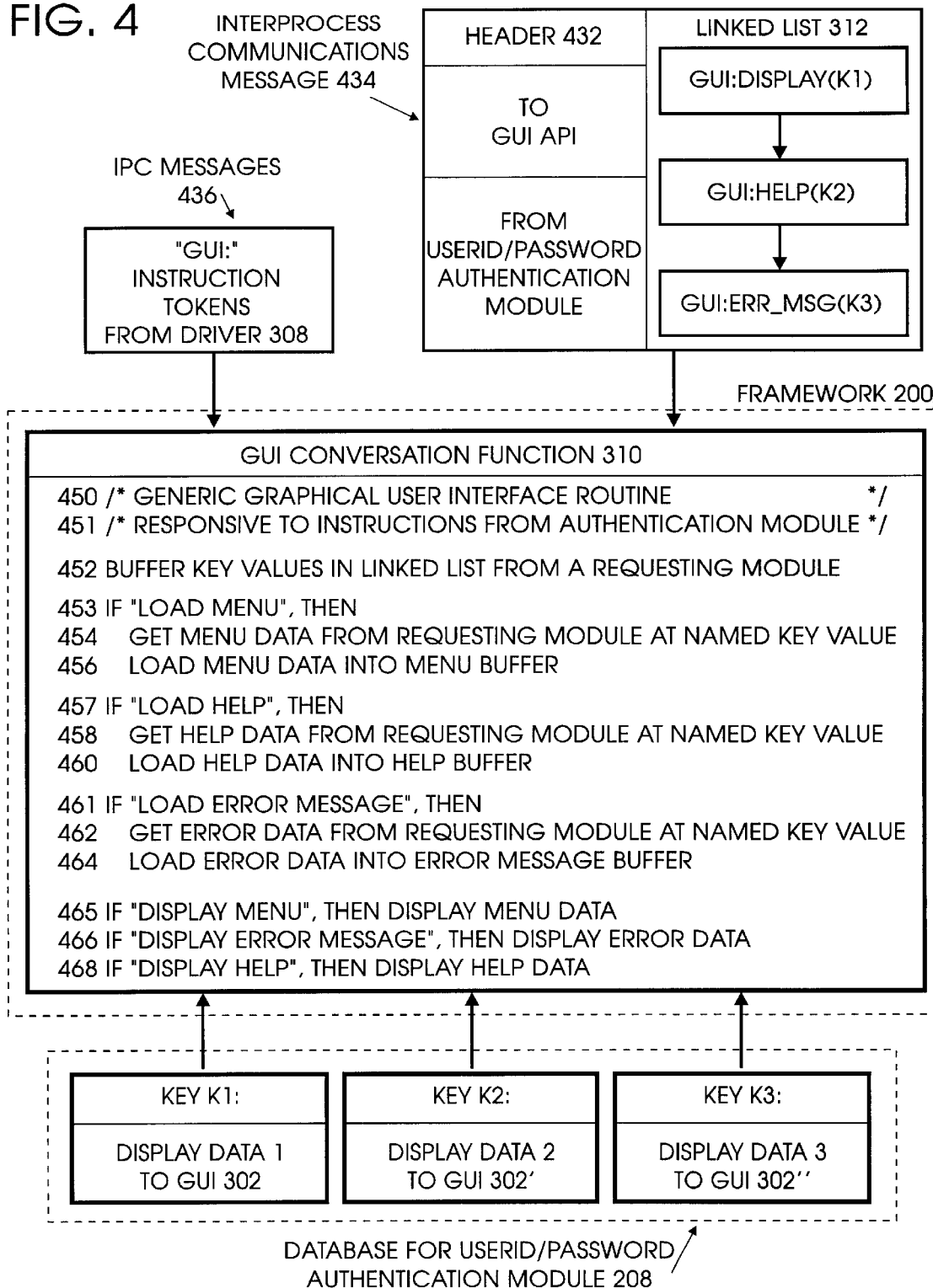

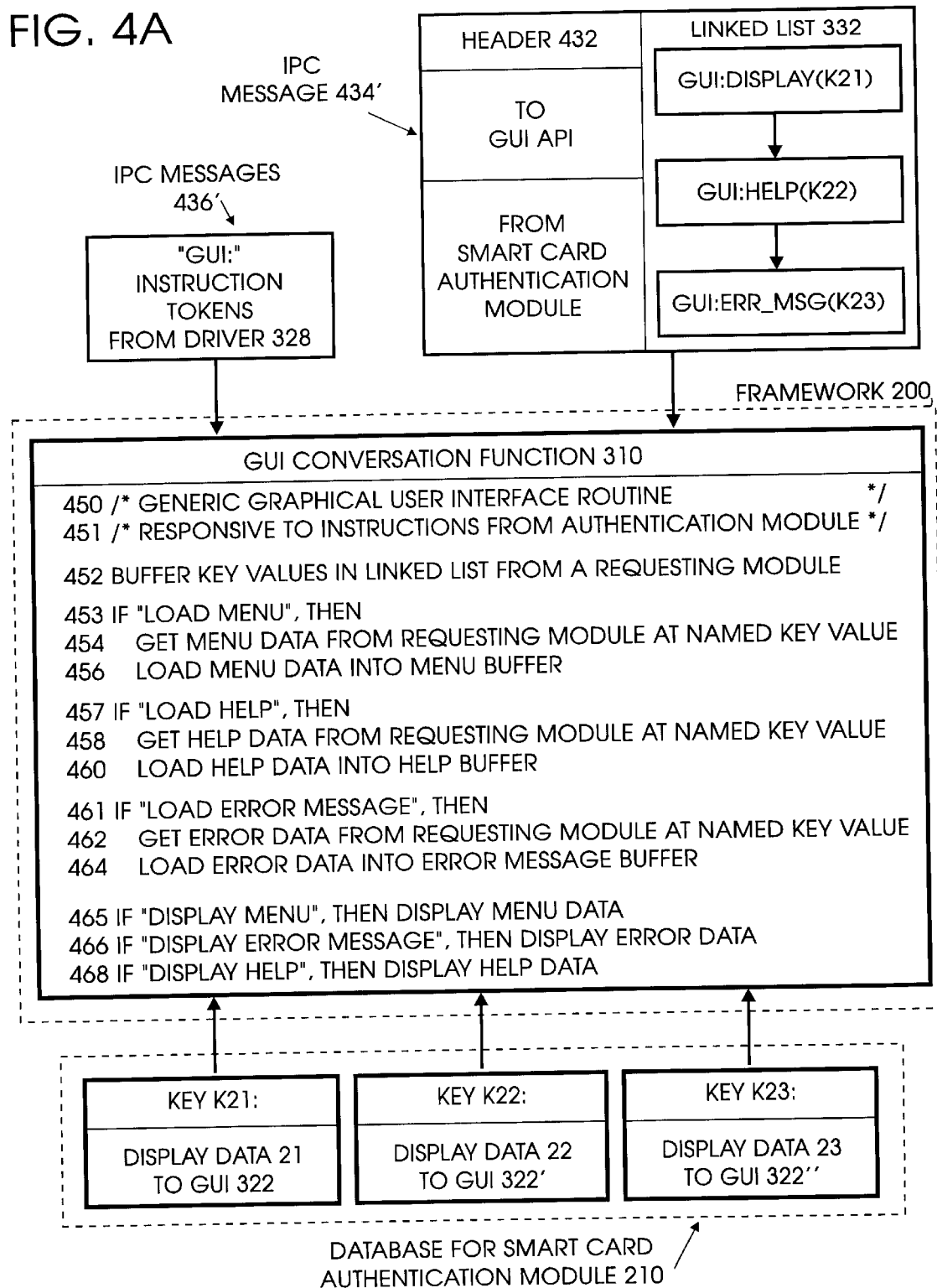

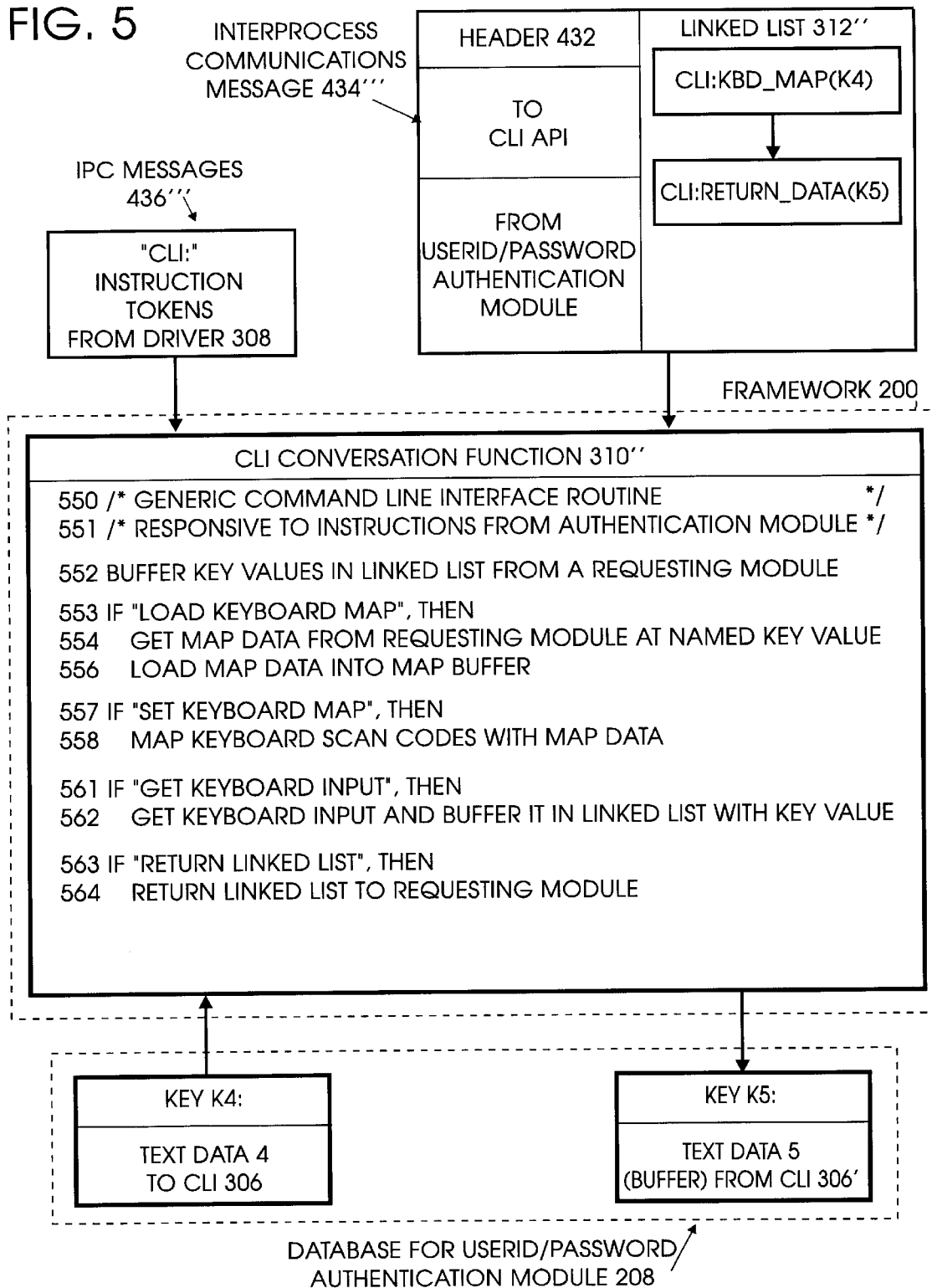

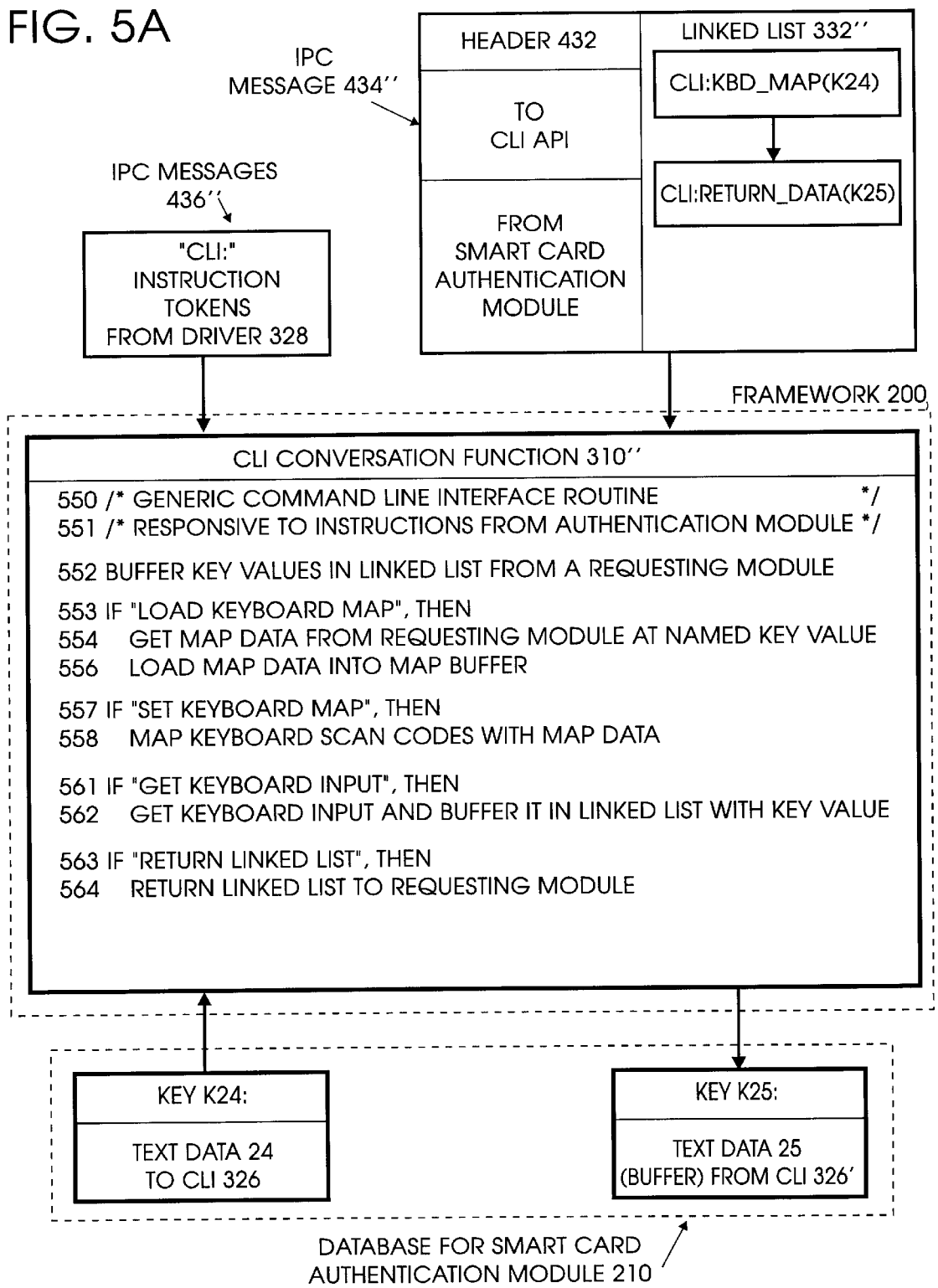

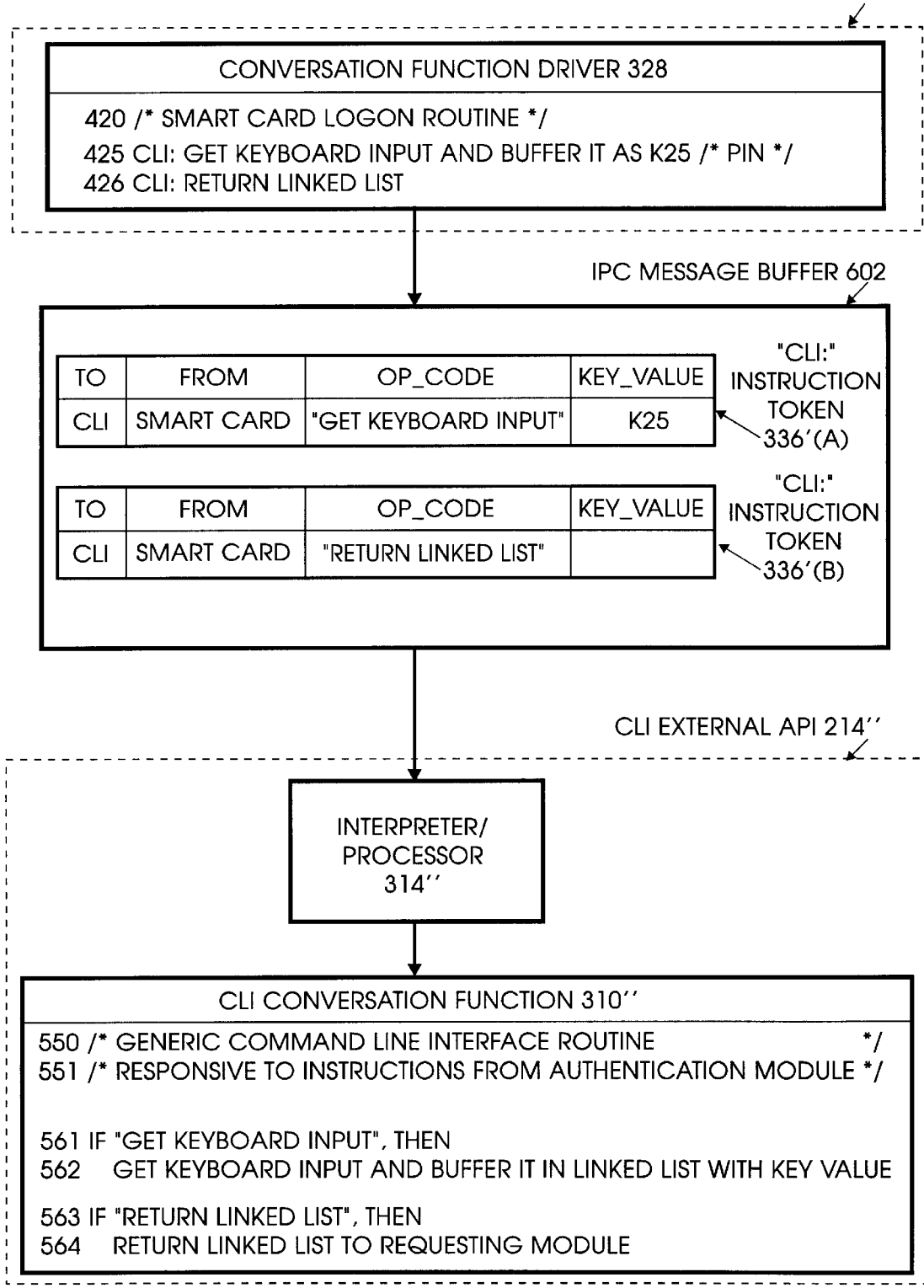

AUTHENTICATION FRAMEWORK FOR MULTIPLE AUTHENTICATION PROCESSES AND MECHANISMS

CROSS-REFERENCE TO RELATES APPLICATIONS

The present application is related to U.S. patent application Ser. No. 09/070,462, filed Apr. 30, 1998, entitled "Single Sign-On (SSO) Mechanism Having Master Key Synchronization"; U.S. patent application Ser. No. 09/070,511 filed Apr. 30, 1998, entitled "Single Sign-On (SSO) Mechanism Having Free Seating Support"; U.S. patent application Ser. No. 09/070,461 filed Apr. 30, 1998, entitled "Coordinating User Target Logons In A Single Sign-On (SSO) Environment"; and U.S. patent application Ser. No. 09/070,512, filed Apr. 30, 1998, entitled "Single Sign-On (SSO) Mechanism Personal Key Manager", all assigned to International Business Machines Corporation, and incorporated herein by reference.

The present application is also related to U.S. patent application Ser. No. 08/556,724, filed Nov. 13, 1995, entitled "Configurable Password Integrity Servers For Use In A Shared Resource Environment," now U.S. Pat. No. 5,838,903, issued Nov. 17, 1998, U.S. patent application Ser. No. 08/557,755, filed Nov. 13, 1995, entitled "Propagating Plain-Text Passwords From a Main Registry to a Plurality of Foreign Registries," now U.S. Pat. No. 5,832,211, issued Nov. 3, 1998, and U.S. patent application Ser. No. 08/557,754, filed Nov. 13, 1995, entitled "Retrieving Plain-Text Passwords From a Main Registry by a Plurality of Foreign Registries," all assigned to International Business Machines Corporation, and incorporated herein by reference.

FIELD OF THE INVENTION

The invention disclosed broadly relates to computer systems and more particularly relates to security features in computer systems.

BACKGROUND OF THE INVENTION

There are many processes for initial authentication of a user to verify the identity of the user or the user's eligibility to access particular resources in a stand alone computer system or in a computer network. Different system administrators may have different security requirements according to the business needs of the systems they administer and they may require different types of authentication mechanisms. For example, some systems may only require presenting a simple userid and password. Other systems may be more sophisticated and require the user to employ authentication mechanisms such as a smart card, a token card, or a fingerprint scanner.

Other examples of user authentication processes include presenting an ATM debit card number and PIN, presenting a smart card's account number and a symmetric Message Authentication Code (MAC), presenting a smart card's account number and an asymmetric digital signature, presenting a user's digital signature and digital certificate, presenting a user's digital certificate and matching asymmetric digital signature, presenting a user's account number and a symmetric MAC or asymmetric digital signature, presenting a user's account number and an asymmetric digital signature.

Biometric authentication processes include finger print scanning, graphical signature scanning, dynamic hand-force sensing while executing a signature, iris and retinal scanning, voice print scanning, and many other techniques. Fingerprint scanning is currently the most proven form of biometric authentication. Other developing biometric authentication processes include retina and iris scanning, hand and face geometry scanning, body odor profiling, and vein scanning. Computerized facial recognition converts a face into a sequence of numbers by component analysis and three-dimensional imaging technology. The iris is rich in features such as fibers, striations, freckles, rifts, pits and other details which contribute to an identity which is more complex than a fingerprint. Body odor profiling recognizes the chemicals that make up a person's individual smell, and separates them to build up a template. Behavioral biometrics measure how a person does something. The two most advanced behavioral biometric authentication processes are signature and voice recognition. Signature recognition authentication is used in credit card and other banking applications. Voice recognition or voice print authentication processes work by isolating characteristics that produce speech, rather than by recognizing the tone of the voice itself.

Such diverse authentication mechanisms require different kinds of authentication data from the user. Different authentication mechanisms have distinctive logic and interface requirements to handle the authentication data. What is needed is a flexible way to provide diverse user authentication mechanisms and processes for a stand alone computer system or for a computer network.

This need becomes particularly acute for a user attempting to logon to a large, distributed system. In typical distributed system environments, a user must access many database systems, network systems, operating systems and mainframe applications. In order to use these systems and applications, the user must typically issue a separate sign-on command for each specific system or application. Each of these sign-ons may, in turn, have a different pair of user ids and passwords, or different smart card authentication processes, or different biometric authentication processes. The problem of coordinating multiple system sign-on requirements has been addressed by the single sign-on (SSO) invention disclosed in the above-referenced patent applications. The single sign-on (SSO) system described in the above referenced patent applications, enables authorized users to perform one initial sign-on to access a variety of networks, systems and applications. However, what is needed now is a flexible way to provide diverse initial authentication mechanisms and processes for such a single sign-on system.

SUMMARY OF THE INVENTION

The invention is a system, method, program, and method of doing business for flexibly providing diverse user authentication mechanisms and processes for a stand alone computer system or for a distributed computer network. An authentication framework subsystem is disclosed for enabling a computer system to authenticate a user with a selected one of a plurality of authentication processes. Each of the authentication processes has a distinct sequence of steps and a unique input/output (I/O) interface for exchanging authentication information with the computer system.

The invention includes an authentication framework in the computer system. An application program interface in the authentication framework provides an interface to an I/O component, such as a graphical user interface (GUI), of the computer system.

A first authentication module interfaces with the framework. It has a first conversation function driver defining a first programmed sequence of steps to authenticate a user with a first authentication process, which could be, for example, a simple userid and password process. A second authentication module also interfaces with the framework. It has a second conversation function driver defining a second programmed sequence of steps different from the first sequence, to authenticate a user with a second authentication process, which could be, for example, a smart card process.

The first conversation function driver in the first authentication module, has access to first information, such as display panels for menus, help screens, and error messages. This information is used during the first authentication process, to configure the I/O component for the first authentication process. The second conversation function driver in the second authentication module, has access to second information, such as a different set of display panels for menus, help screens, and error messages. This second information is used during the second authentication process, to configure the I/O component for the second authentication process.

A conversation function in the application program interface, defines a programmed sequence of steps for controlling the I/O component in response to generic instructions that have the same format, whether or not they are received from the first conversation driver or from the second conversation driver. The conversation function can selectively receive generic instructions and the first information from the first conversation driver, to perform suitable I/O functions for the first authentication process. Alternately, the conversation function can selectively receive a different sequence of generic instructions and the second information from the second conversation driver, to perform suitable I/O functions for the second authentication process.

The generic conversation function provides a generic instruction format for diverse authentication processes, which is adapted to control the unique operational characteristics of multiple types of I/O components. Each instance of the generic conversation function is implemented in a corresponding external API that controls a particular I/O component. The implementation of the generic conversation function for a GUI, for example, contains all of the details pertaining to the unique display characteristics of that component. Unique implementations of the generic conversation function can be applied to control a graphical user interface, a local object interface, a network object interface, a command line interface, and the like. The generic conversation function is invoked by a conversation function driver within each authentication module, the driver being customized for each respective authentication process. Instruction tokens are passed from a conversation function driver for a particular authentication process, into the authentication framework as input parameters to the generic conversation function implemented in a particular external API controlling a particular I/O component. Before the generic conversation function is invoked, each authentication module determines what data will be displayed to the user and it composes that data, which it passes to the generic conversation function by means of linked lists. The data is composed as a linked list of key value attributes, where each key represents a specific data field to the user. The generic conversation function implementation in the external API uses these key attributes to access the data, which determines the style or format of the final presentation to the user. The generic conversation function can also obtain authentication data from the user, such as a pin number or a userid, which is passed back to the authentication module by returning the linked list.

In one embodiment of the invention, an authentication method enables the computer system to authenticate a user with an authentication process. The method includes defining a programmed sequence of steps in the authentication process to authenticate the user with a conversation function driver in the authentication module. The method further includes configuring a display component, for example, to be customized for the authentication process, by means of using information provided by the conversation function driver. The method further includes defining a programmed sequence of steps in the conversation function in the application program interface for controlling the display component, for example, in response to generic instructions and the information received from the conversation driver. And the method further includes providing authentication data to host processes with the authentication module. The conversation function controlled by the conversation function driver can cause a display of a authentication dialog to be presented on the display component, for example. The authentication module can provide credentials derived from the authentication process to a host process, such as a single sign-on system.

In alternate embodiments of the invention, the conversation function driver in the authentication module can also implement various types of biometric authentication processes, such as fingerprint scanning, iris and retinal scanning, voice print scanning, hand and face geometry scanning, body odor profiling, vein scanning, signature recognition, and the like, in which case the authentication module coordinates the operation of the corresponding biometric input device.

In this manner, diverse user authentication mechanisms and processes can be selectively provided for a stand alone computer system or for a distributed computer network.

DESCRIPTION OF THE FIGURES

FIG. 4 illustrates the data flow paths for interprocess communications (IPC) messages for the linked list 312, for the GUI instruction tokens, and for the display data, going from the userid/password authentication module 208 of FIG. 3 to the GUI conversation function 310.

FIG. 4A illustrates the data flow paths for interprocess communications (IPC) messages for the linked list 332, for the GUI instruction tokens, and for the display data, going from the smart card authentication module 210 of FIG. 3A to the GUI conversation function 310.

FIG. 5 illustrates the data flow paths for interprocess communications (IPC) messages for the linked list 312", for the CLI instruction tokens, and for the text data, going from the userid/password authentication module 208 of FIG. 3 to the CLI conversation function 310".

FIG. 5A illustrates the data flow paths for interprocess communications (IPC) messages for the linked list 332", for the GUI instruction tokens, and for the text data, going from the smart card authentication module 210 of FIG. 3A to the CLI conversation function 310".

FIG. 7A illustrates the data flow paths for interprocess communications (IPC) messages for the CLI instruction tokens 336' going from the smart card authentication module 210 of FIG. 3A to the conversation function 310" of the CLI external API 214".

DISCUSSION OF THE PREFERRED EMBODIMENT

Figure 1A:
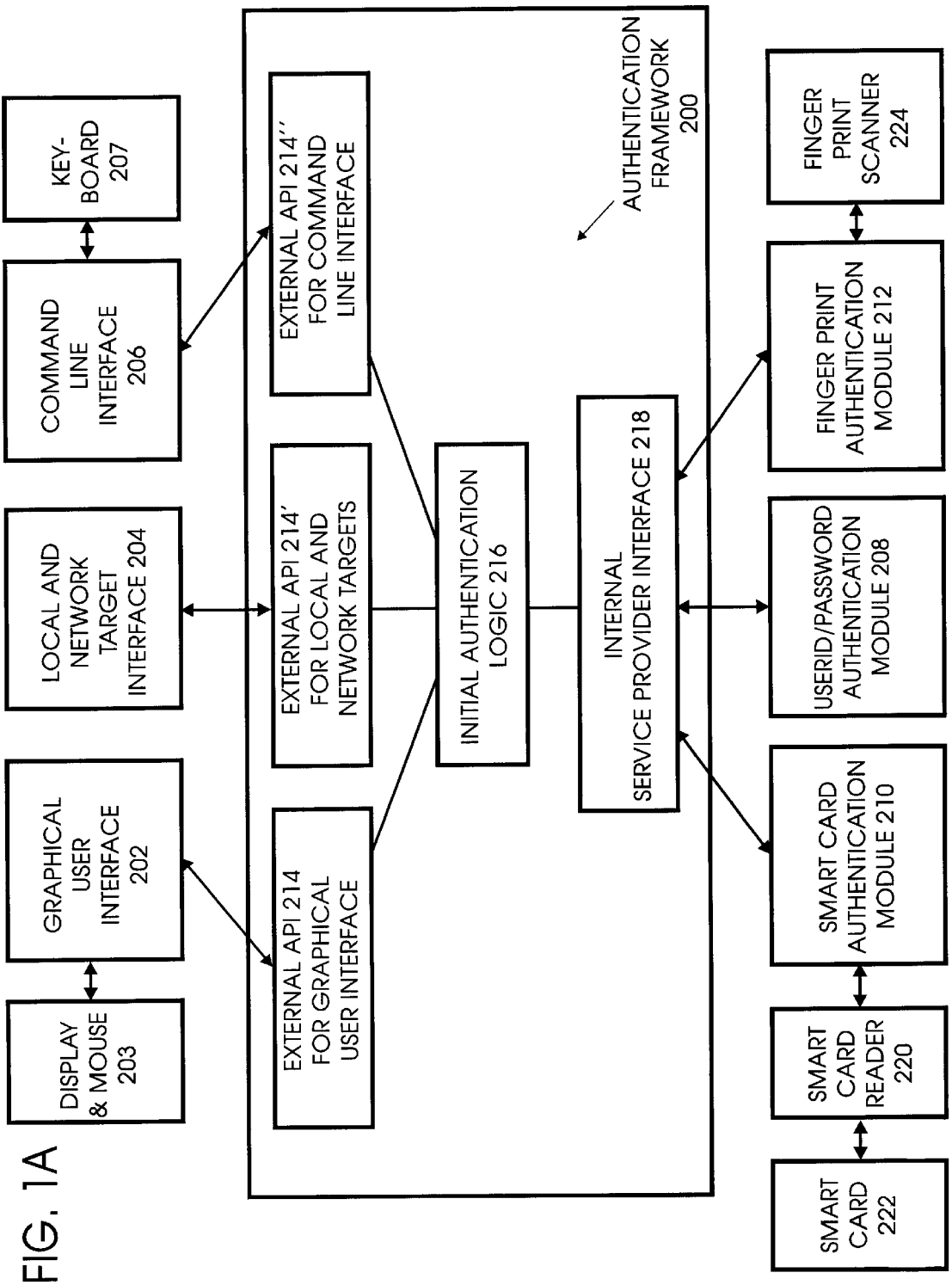
FIG. 1A illustrates the relationship of the authentication framework with the authentication modules and the computer system interfaces, such as the graphical user interface (GUI) interface and the command line interface (CLI).
Figure 9:
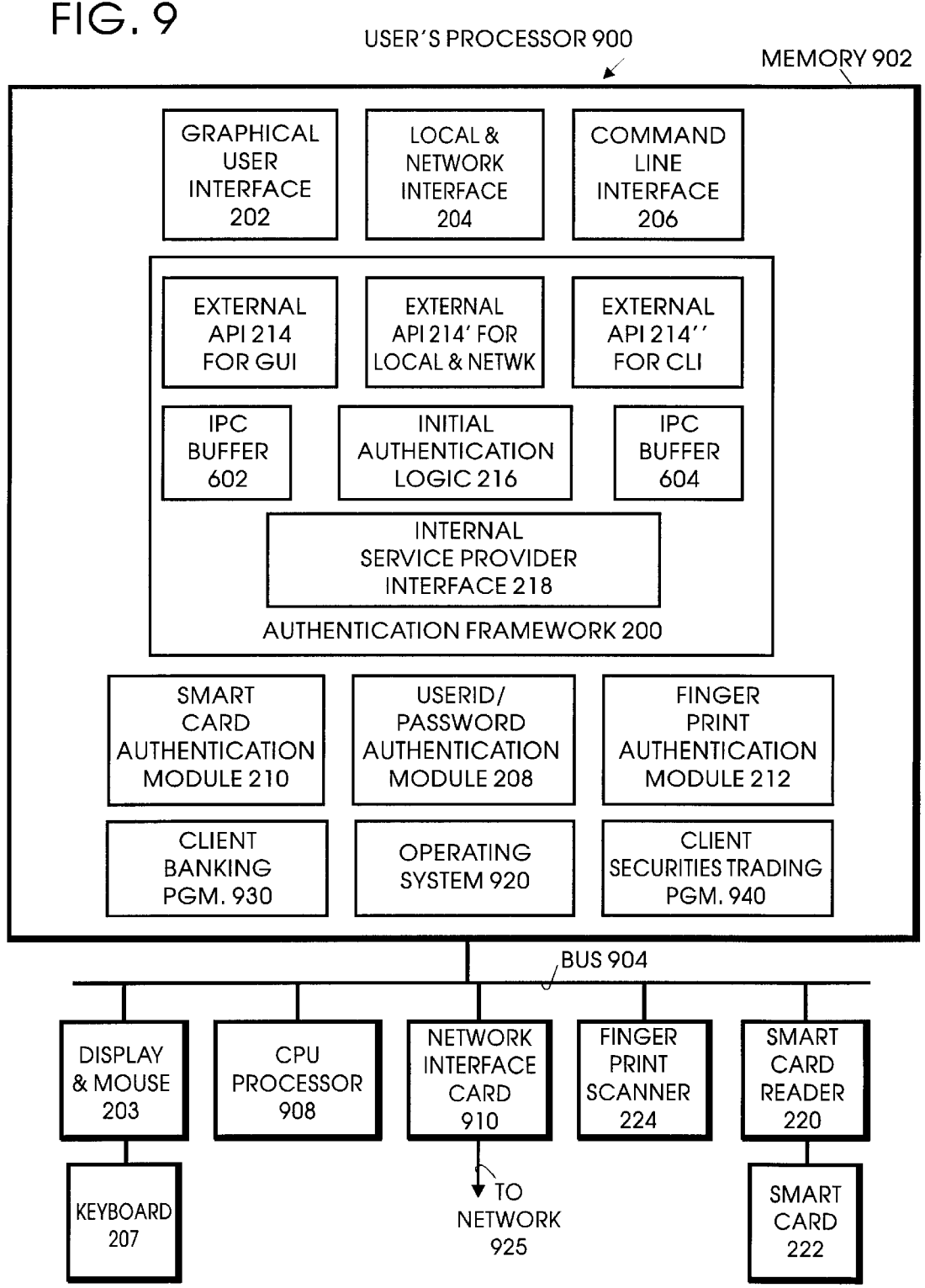
FIG. 9 is a functional block diagram of a user's processor 900, programmed in accordance with the invention to selectively provide several types of user authentication mechanisms and processes.

The inventive authentication framework 200 is shown in FIG. 1A in conjunction with several authentication modules providing userid/password authentication 208, smart card authentication 210, and fingerprint authentication 212. The authentication framework 200 is also shown in conjunction with several computer system interfaces, such as the graphical user interface (GUI) 202 and the command line interface (CLI) 206. The invention enables a computer system to authenticate a user with a selected one of a plurality of authentication processes that may be required by a particular target application, such as a banking application or securities trading application. Each of the authentication processes has a distinct sequence of steps and a unique input/output (I/O) interface for exchanging authentication information with the computer system. FIG. 9 is a functional block diagram of a user's processor 900, such as a personal computer, programmed in accordance with the invention, to selectively provide several types of user authentication mechanisms and processes.

An example scenario for the invocation of the invention is when a user wishes to conduct online financial transactions over the internet, shown as network 925, with two financial institutions, one a bank and the other a brokerage house. In this scenario, the user plans to check the balance in a bank account before placing a buy order for securities with the brokerage house. The user's computer includes a client online banking program 930 provided by the bank and a client online securities trading program 940 provided by the brokerage house, which run on top of the operating system program 920.

It is the policy of the bank to require a smart card authentication of its customers when conducting online transactions. To this end, the user has a smart card 222 which is inserted into a smart card reader 220 of the processor 900. An associated smart card authentication module program 210 is stored in the memory 902 of the processor to interface the smart card with the authentication framework 200, to provide appropriate prompts to and dialogs with the user. The smart card authentication module 210 defines a programmed sequence of steps in a conversation function driver 328 shown in FIG. 3A, to authenticate the user with a smart card authentication process. The prompts and dialogs must be provided to the user via the graphical user interface 202 which controls the display and mouse 203 and also by the command line interface 206 which controls the keyboard 207.

In accordance with the invention, the authentication framework 200 includes an external application program interface (API) 214 for the graphical user interface 202, that includes a GUI conversation function 310 shown in FIG. 4A. The GUI conversation function 310 defines a programmed sequence of steps for controlling the graphical user interface 202 in response to generic instructions that have the same format, whether or not they are received from the smart card authentication module 210 or from another authentication module such as the userid/password authentication module 208 or the fingerprint authentication module 212. The GUI conversation function 310 can selectively receive generic instructions from any selected one of the several authentication modules 208, 210, or 212, to perform suitable prompting and dialog functions for the corresponding selected authentication process. The conversation function driver 328 in the smart card authentication module 210, forms a linked list 332 of information, such as a set of display panels for menus, help screens, and error messages. This linked list 332 is used during the smart card authentication process, to configure the graphical user interface 202 for the smart card authentication process.

The client banking program invokes the smart card authentication module 210 to authenticate the user by means of the smart card 222.

Continuing with the example scenario, it is the policy of the brokerage house to require a userid and password authentication of its customers when conducting online transactions. To this end, the user has a userid and password which the user inputs at the keyboard 207 of the processor 900. An associated userid/password authentication module program 208 is stored in the memory 902 of the processor to interface with the authentication framework 200, to provide appropriate prompts to and dialogs with the user. The userid/password authentication module 208 defines a programmed sequence of steps in a conversation function driver 308 shown in FIG. 3, to authenticate the user with a userid/password authentication process. The prompts and dialogs must be provided to the user via the graphical user interface 202 which controls the display and mouse 203 and also by the command line interface 206 which controls the keyboard 207.

In accordance with the invention, the authentication framework 200 includes the external application program interface (API) 214 for the graphical user interface 202, that includes the GUI conversation function 310 shown in FIG. 4. The GUI conversation function 310 defines a programmed sequence of steps for controlling the graphical user interface 202 in response to generic instructions that have the same format, whether or not they are received from the userid/password authentication module 208 or from another authentication module such as the smart card authentication module 210 or the fingerprint authentication module 212. The GUI conversation function 310 can selectively receive generic instructions from any selected one of the several authentication modules 208, 210, or 212, to perform suitable prompting and dialog functions for the corresponding selected authentication process. The conversation function driver 308 in the userid/password authentication module 208, forms a linked list 312 of information, such as a set of display panels for menus, help screens, and error messages. This linked list 312 is used during the userid/password authentication process, to configure the graphical user interface 202 for the userid/password authentication process.

The client online securities trading program 940 provided by the brokerage house invokes the userid/password authentication module 208 to authenticate the user by means of the user typing in the userid and password.

FIGS. 2, 3, 4, 5, 6, 7, and 8 describe the operations of the invention for userid/password authentication. FIGS. 2A, 3A, 4A, 5A, 6A, 7A, and 8A describe the operations of the invention for smart card authentication. FIGS. 2B, 3B, 4B, 5B, 6B, 7B, and 8B describe the operations of the invention for fingerprint or other types of biometric authentication.

FIG. 1A shows other components in the system in addition to the authentication framework 200. The local and network target interface 204 represents an interface for local applications residing in the processor 900 and remote applications residing out on the network 925 which can be communicated with through the interface 204 and the network interface card 910. In addition, the fingerprint authentication module 212 coordinates the operation of the fingerprint scanner 224. Similarly, the smart card authentication module 210 coordinates the operation of the smart card reader 220 and the smart card 222. In alternate embodiments of the invention, authentication modules such as module 212 can also implement other types of biometric authentication processes, such as iris and retinal scanning, voice print scanning, hand and face geometry scanning, body odor profiling, vein scanning, signature recognition, and the like, in which cases the authentication module 212 coordinates the operation of corresponding biometric input devices 224. The authentication framework 200 includes an external API 214' for the local and network target interface 204. The initial authentication logic 216 provides the interface between the external APIs 214, 214 and 214" and the internal service provider interface 218.

The authentication framework 200 is designed to allow different kinds of authentication mechanisms to be plugged into the system, which will require no code change to the graphical user interface 202, local and network target interface 204, and command line interface 206. To achieve this code encapsulation, the authentication framework 200 exposes the external APIs 214, 214', and 214" to the interfaces 202, 204 and 206, respectively, for all authentication related operations which include a log on, password change, credential refresh and checking and log off procedures. The system components such as the graphical user interface 202, local and network target interface 204, and command line interface 206 merely call the APIs 214, 214', and 214", respectively, and pass in required parameters and are completely independent of all the details in handling authentication operation. To facilitate an easy plug in of different types of authentication mechanisms such as a fingerprint scanner 224 and a smart card reader 220, the authentication framework 200 provides the internal service provider interface 218 which is to be implemented by each authentication module 210, 208 and 212, for the corresponding authentication mechanisms. Each authentication module 210, 208, and 212, has a different implementation for the internal service provider interface 218 due to the unique operational characteristics of the corresponding authentication mechanism such as the smart card reader 220/smart card 222 and the fingerprint scanner 224. However, the implementation details within each authentication module 210, 208 and 212 are hidden from the authentication framework 200, itself In one application to the Global Sign-On (GSO) single sign-on client/server architecture, which is based on a distributed computer environment (DCE), the internal service provider interfaces 218 used by the authentication framework 200, retrieve information necessary to the particular authentication process from a plugged in authentication module such as the module 210, 208 and 212. This enables the user to be authenticated via the corresponding authentication mechanism, for example a fingerprint scanner 224 or a smart card 222. Each plugged in authentication module 210, 208, and 212 provides a customized database capability for a corresponding authentication process.

For example, if a smart card 222 is plugged into the smart card reader 220 and a user's DCE ID and password is stored in the smart card, the user needs to be authenticated by the smart card and its smart card authentication module 210.

The user needs to be authenticated by the smart card first with a smart card pin No., and then the authentication framework 200 can retrieve the user's DCE ID and password from the smart card 222 and use them to sign the user on. If the authentication framework 200 is a part of the Global Sign-On system, then the Global Sign-On system uses the DCE ID and password to log on to the system.

Each authentication mechanism, such as the smart card 222 and the fingerprint scanner 224, requires different kinds of authentication data from the user, for example, a PIN for smart card or the user's finger for the fingerprint scanner, during an authentication process. If any error occurs during the process, error messages specific to the authentication mechanism need to be displayed to the user on the display 203 using the graphical user interface 202. As in most general purpose systems, the channels to obtain authentication data and to display error messages fully rely on the graphical user interface 202 and the command line interface 206, and these components will have no knowledge of how to access the information specific to the current authentication mechanism performing the authentication process. In accordance with the invention, a conversation function is designed to allow the graphical user interface 202 or the command line interface 206 to pass their respective interface functions through the authentication framework 200 to each authentication module 210, 208 and 212, which need those functions during the respective authentication process.

Figure 2:
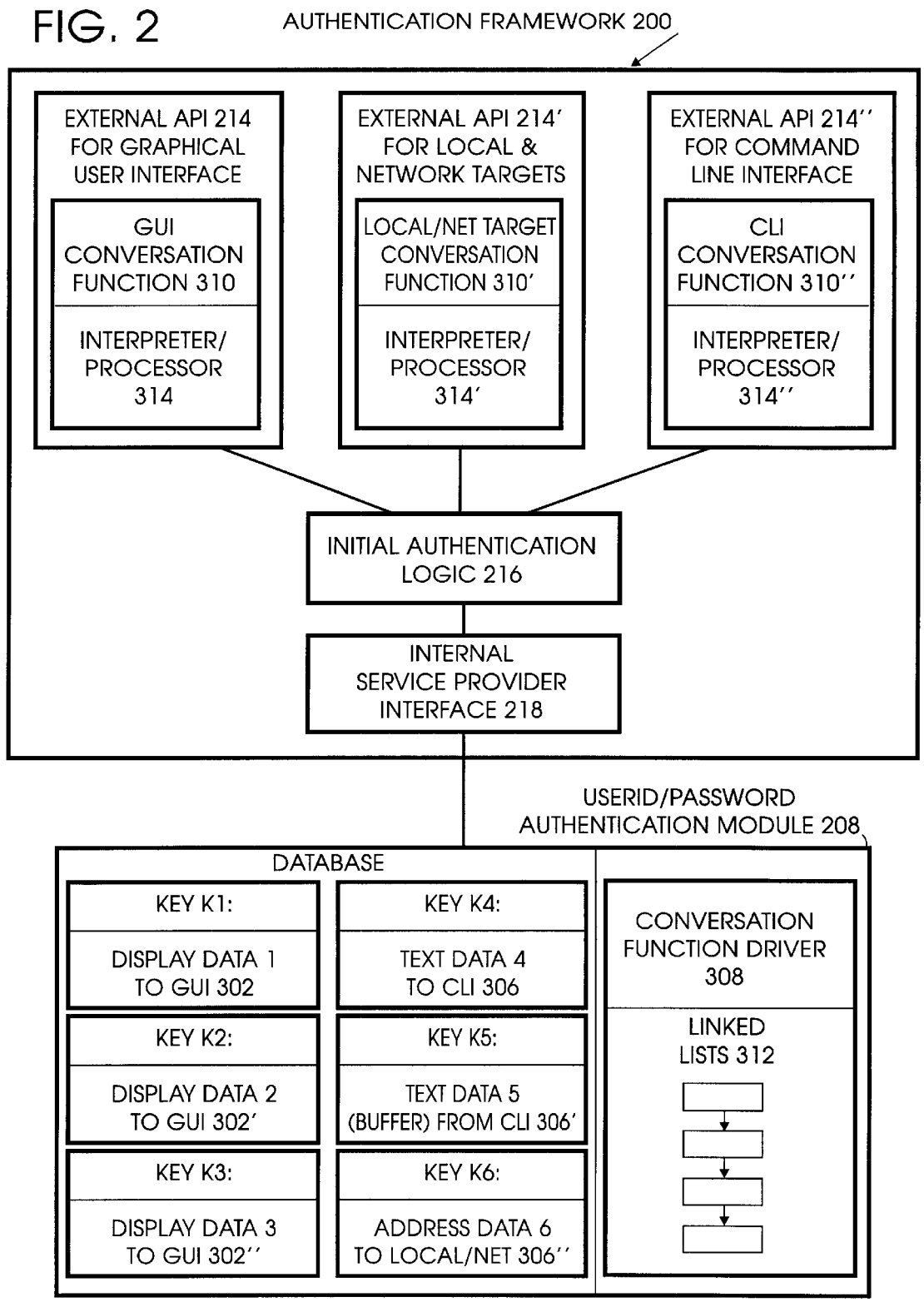
FIG. 2 illustrates the relationship of the authentication framework 200 with the userid/password authentication module 208.

FIG. 2 illustrates the relationship of the authentication framework 200 with the user ID/password authentication module 208. The external API 214 for the graphical user interface includes a GUI conversion function 310 and an interpreter processor 314. The external API 214' for the local and network interface includes a local/network target conversation function 310' and an interpreter/processor 314'. The external API 214" for the command line interface includes a command line interface (CLI) conversation function 310" and an interpreter/processor 314". The user ID/password authentication module 208 shown in FIG. 2 includes a conversation function driver 308, linked lists 312, and a database of data and key values which are used by the authentication module 208 to communicate with the external API 214 for graphical user interface and the external API 214' for local and network target interface, and the external API 214" for command line interface.

The generic conversation function format is designed for each respective user interface component 202, 204 or 206, to provide an implementation of the conversation function. Each implementation contains all of the details pertaining to the unique characteristics of the corresponding graphical user interface 202, local and network target interface 204, and command line interface 206. The conversation function is passed into the authentication framework 200 as an input parameter of the external APIs 214, 214' and 214", and will be invoked within each authentication module 210, 208 and 212. Before the conversation function is invoked, each authentication module determines what data will be displayed to the user and it composes that data and passes it to the conversation function by means of linked lists such as the linked list 312. The data is composed as a linked list of key value attributes, and each key represents a specific data field to the user, as is shown in FIG. 2. For example, the key K1 corresponds to display data 302 which goes to the GUI. The key value K4 corresponds to text data 4 to the command line interface, data 306. The key value K6 corresponds to address data 6 to the local/network target interface conversation function 310', as data 306". The actual conversation function implementation converts these data attributes to determine the style or format of the final display on the graphical user interface 202, for example. The conversation function also obtains authentication data from the user or provides display error messages to the user, as needed. If data is to be acquired from the user, then when the conversation function returns, the invoking authentication module can retrieve the data from the linked list 312, for example, and use that data for the authentication process specific to the authentication mechanism, for example, the smart card 222 or the fingerprint scanner 224.

The conversation function is designed in a generic manner so that it supports different authentication processes such as user ID/password authentication, smart card authentication, fingerprint authentication, and the like. The conversation function also supports multiple authentication functions such as log on, context refresh, password change, log off, and the like. The conversation function also supports distinct authentication data requirements such as passwords, PIN values, pass codes, and the like.

Figure 2A:
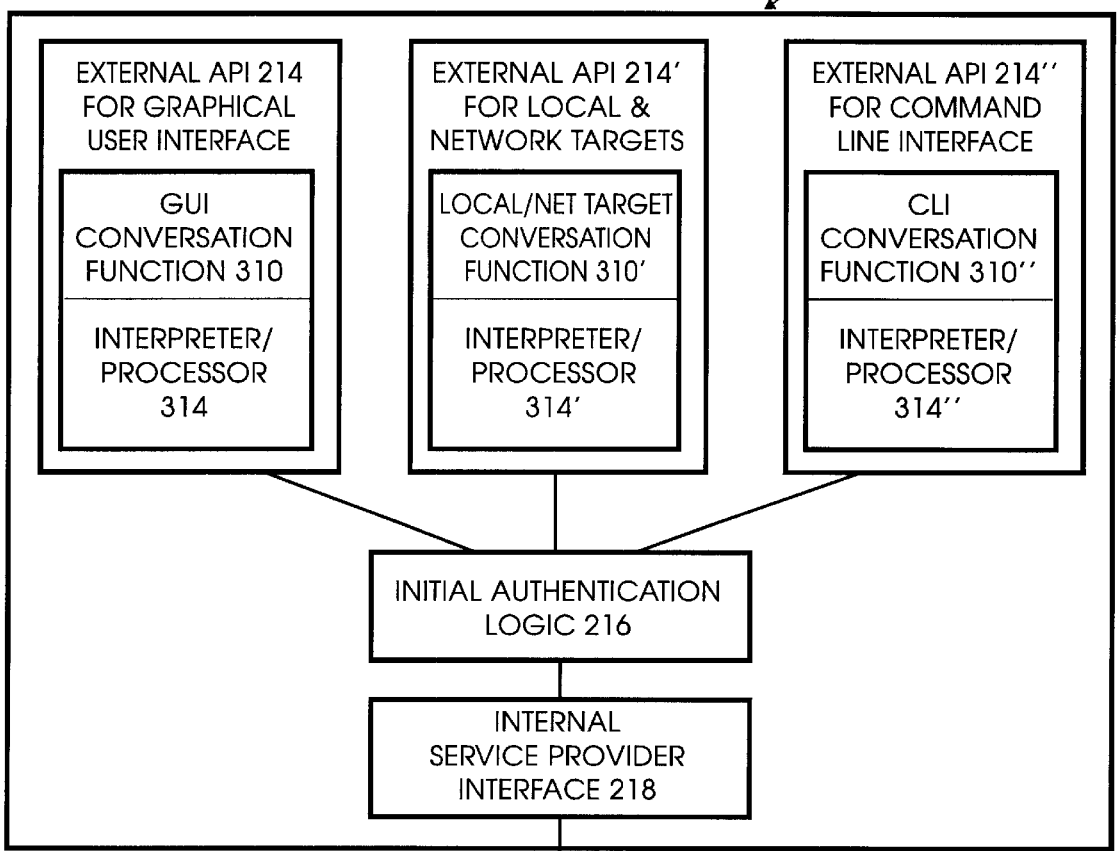
FIG. 2A illustrates the relationship of the authentication framework 200 with the smart card authentication module 210.
Figure 2A:
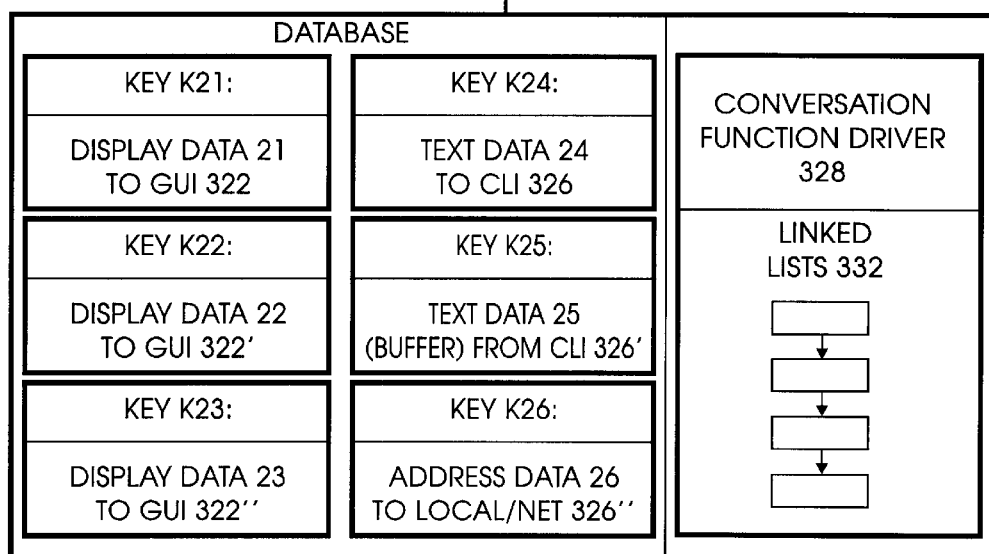

FIG. 2A illustrates the relationship of the authentication framework 200 with the smart card authentication module 210. The authentication framework 200 remains the same as was described for FIG. 2 in connection with the user ID/password authentication module 208. However, the smart card authentication module 210, shown in FIG. 2A, includes the conversation function driver 328, linked lists 332, and the database shown with different key values K21–K26 and different data 322, 326 than was shown in the user ID/password authentication module 208 of FIG. 2.

Figure 2B:
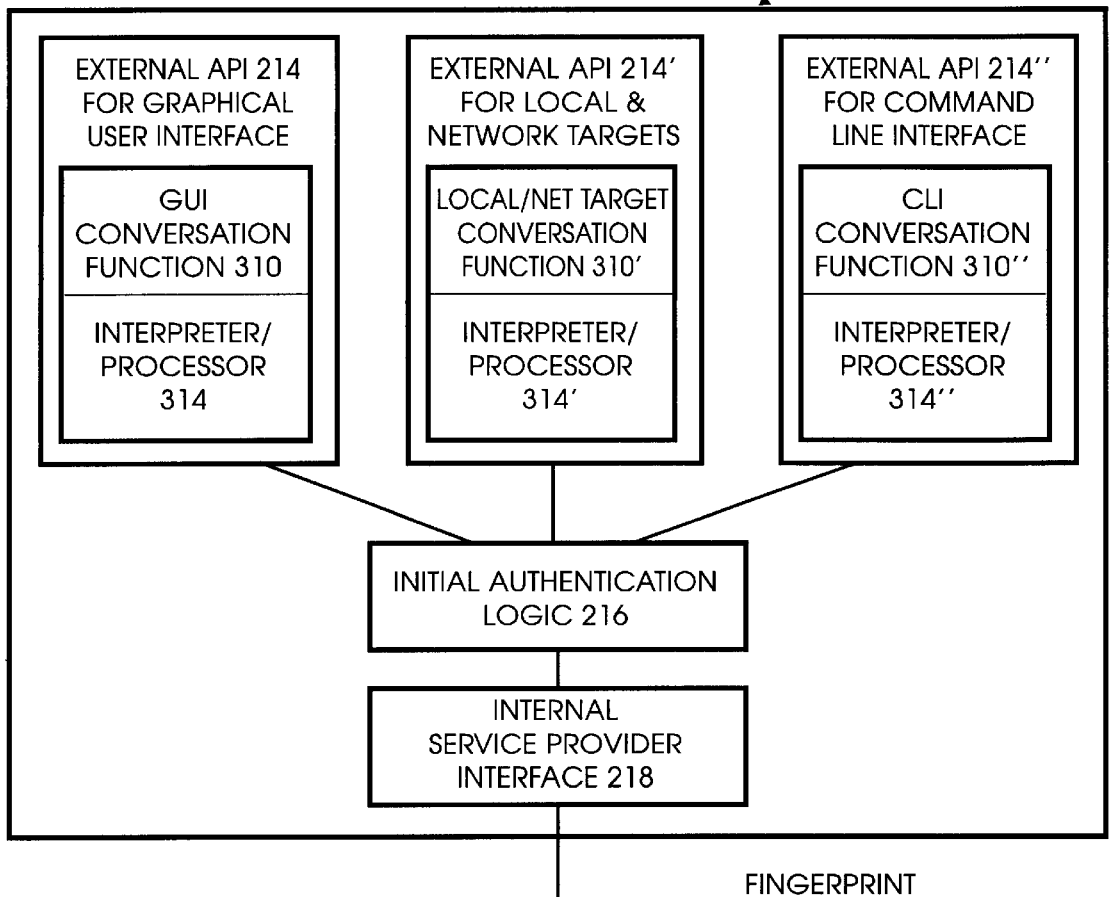
FIG. 2B illustrates the relationship of the authentication framework 200 with the fingerprint authentication module 212.
Figure 2B:
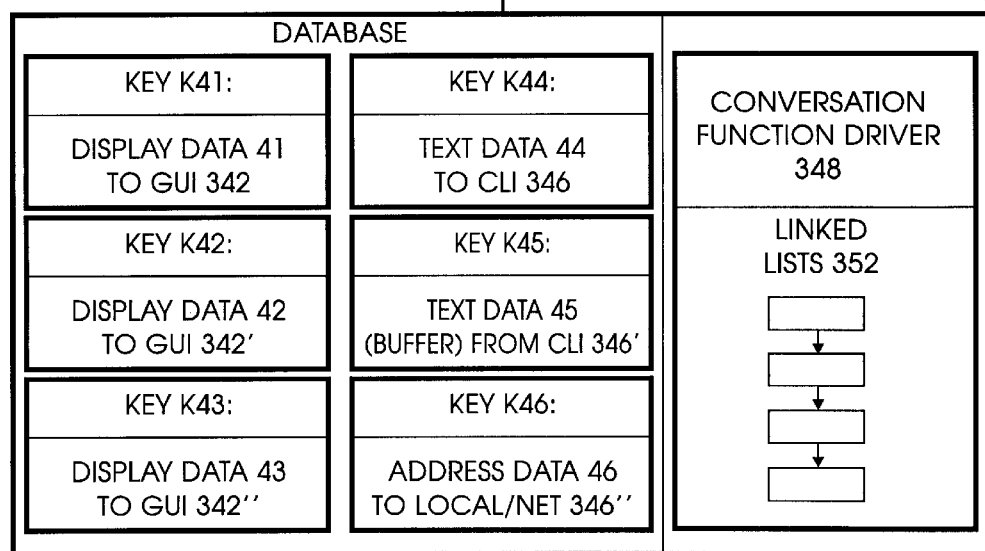

FIG. 2B illustrates the relationship of the authentication framework 200 with the fingerprint authentication module 212. The authentication framework 200 remains the same as was described for FIG. 2 in connection with the user ID/password authentication module 208. However, the fingerprint authentication module 212, shown in FIG. 2B, includes the conversation function driver 348, linked lists 352, and the database shown with different key values K41–K46 and different data 342, 346 than was shown in the user ID/password authentication module 208 of FIG. 2.

Alternate embodiments of the invention include authentication modules such as module 212 which implement other types of biometric authentication processes, such as iris and retinal scanning, voice print scanning, hand and face geometry scanning, body odor profiling, vein scanning, or signature recognition, and the like. In these cases, FIG. 2B illustrates the relationship of the authentication framework 200 with the biometric authentication module 212. The authentication framework 200 remains the same as was described for FIG. 2 in connection with the user ID/password authentication module 208. However, the biometric authentication module 212, shown in FIG. 2B, includes the conversation function driver 348, linked lists 352, and the database shown with different key values K41–K46 and different data 342, 346 than was shown in the user ID/password authentication module 208 of FIG. 2.

Figure 3:
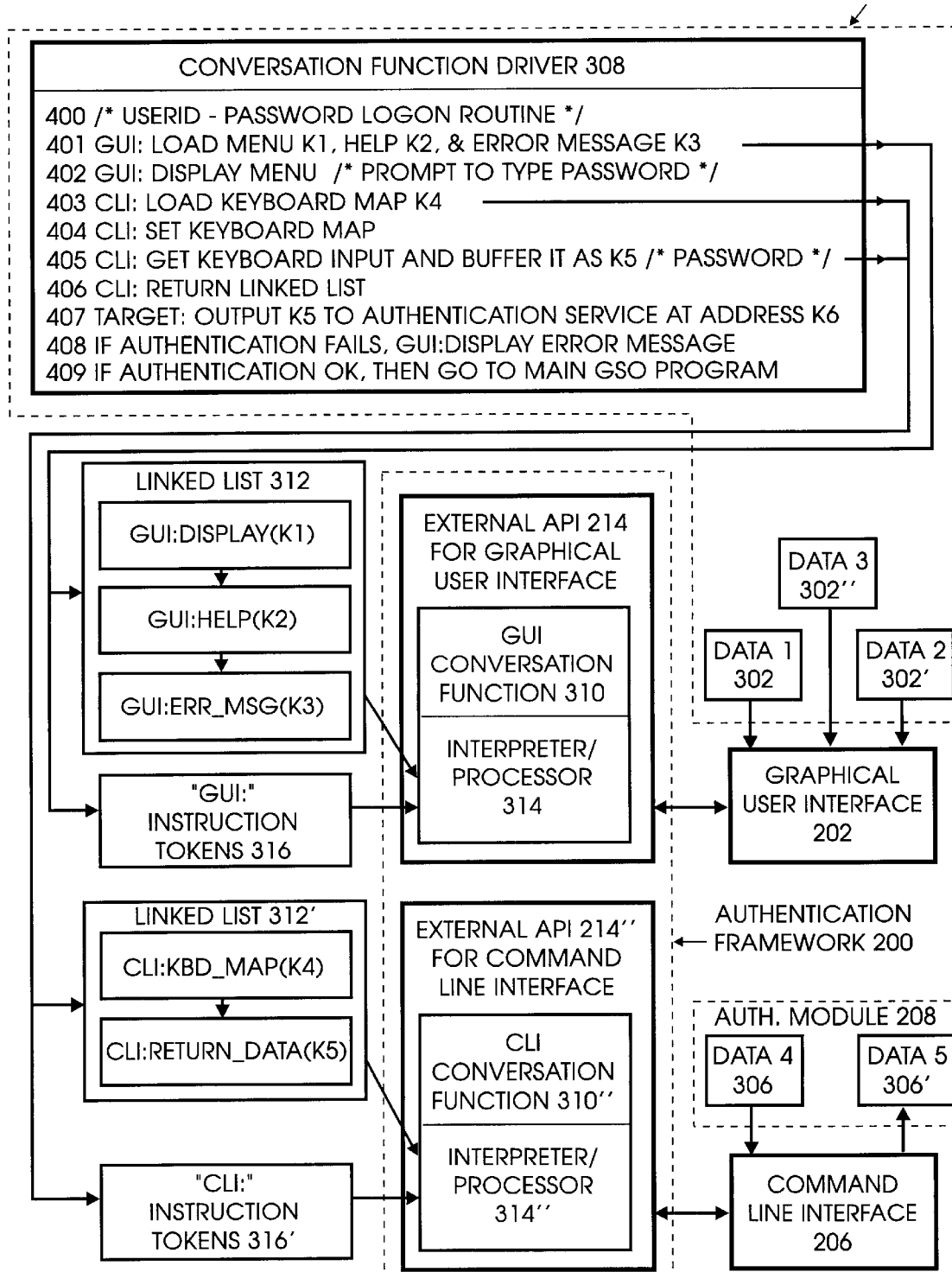
FIG. 3 illustrates the data flow paths between the userid/password authentication module 208 and the external API 214 for the graphical user interface 202 and with the external API 214" for the command line interface 206.

FIG. 3 illustrates the data flow paths between the user ID/password authentication module 208 and the external API 214 for the graphical user interface 202 and also with the external API 214" for the command line interface 206. The conversation function driver 308 and the user ID/password authentication module 208, includes a sequence of program instructions for carrying out a user ID/password log on routine. Instruction 400 is a comment. Instructions 401 and 402 are designated as GUI instructions and they will be converted by the conversation function driver 308 into GUI instruction tokens 316 which will be sent to the external API 214 for the graphical user interface to be interpreted and processed at 314 for the GUI conversation function 310. The instructions 403, 404, 405 and 406 are CLI instructions which will be converted by the conversation function driver 308 into CLI instruction tokens 316' which will be sent to the external API 214" for command line interface to be interpreted by the interpreter processor 314" and applied in the CLI conversation function 310". Step 407 is a target instruction which will be converted by the conversation function driver 308 into a target instruction token which will be sent to the external API 214' for local and network target interface, to be processed by the interpreter processor 214' and applied in the local/network target conversation function 310' of FIG. 2A. The user ID/password authentication module 208 will also pass the linked lists 312 to the external API 214 for the graphical user interface and it will pass the linked lists 312' to the external API 214" for the command line interface. Linked list 312 will provide display data, help data and error message data to the graphical user interface 202. The linked list 312' will provide keyboard mapping data to the command line interface 206. The linked list 312' also provides a buffer in the form of the return data buffer 306' or 326' which enables the command line interface 206 to return a keyboard entry from the keyboard 207 for a password or PIN No. entered by the user. In that case, the external API 214" for command line interface will be programmed to return the linked list 312' to enable the user ID/password authentication module 208 to make use of the password or PIN No. in its authentication process. The instruction 406 of the conversation function driver 308 is seen to be a CLI instruction "return linked list" which causes the CLI conversation function 310" in the external API 314" to return the linked list as desired, to the authentication module 208. Instructions 408 and 409 of the conversation function driver 308 of FIG. 3 perform logical operations on the result of authentication which has been performed by an authentication service requested by the instruction 407. If authentication fails, then a GUI instruction token is sent to the external API 214 to the graphical user interface, to display the error message which was previously identified by the key value K3 supplied in the linked list 312 to the external API 214. Alternately, instruction 409 performs the logical operation that if the authentication is OK, then the conversation function driver 308 returns to the main system program. As is seen in FIG. 3, the graphical user interface 202, in response to the programmed operations of the external API 214 to the graphical user interface, which is under the program control of the conversation function driver 308 of the user ID/password authentication module 208, will utilize the data 1 (302), the data 3 (302"), and the data 2 (302') from the database of FIG. 2, to perform the desired graphical user interface interactions with the user to carry out the authentication process for user ID/password authentication.

Figure 3A:
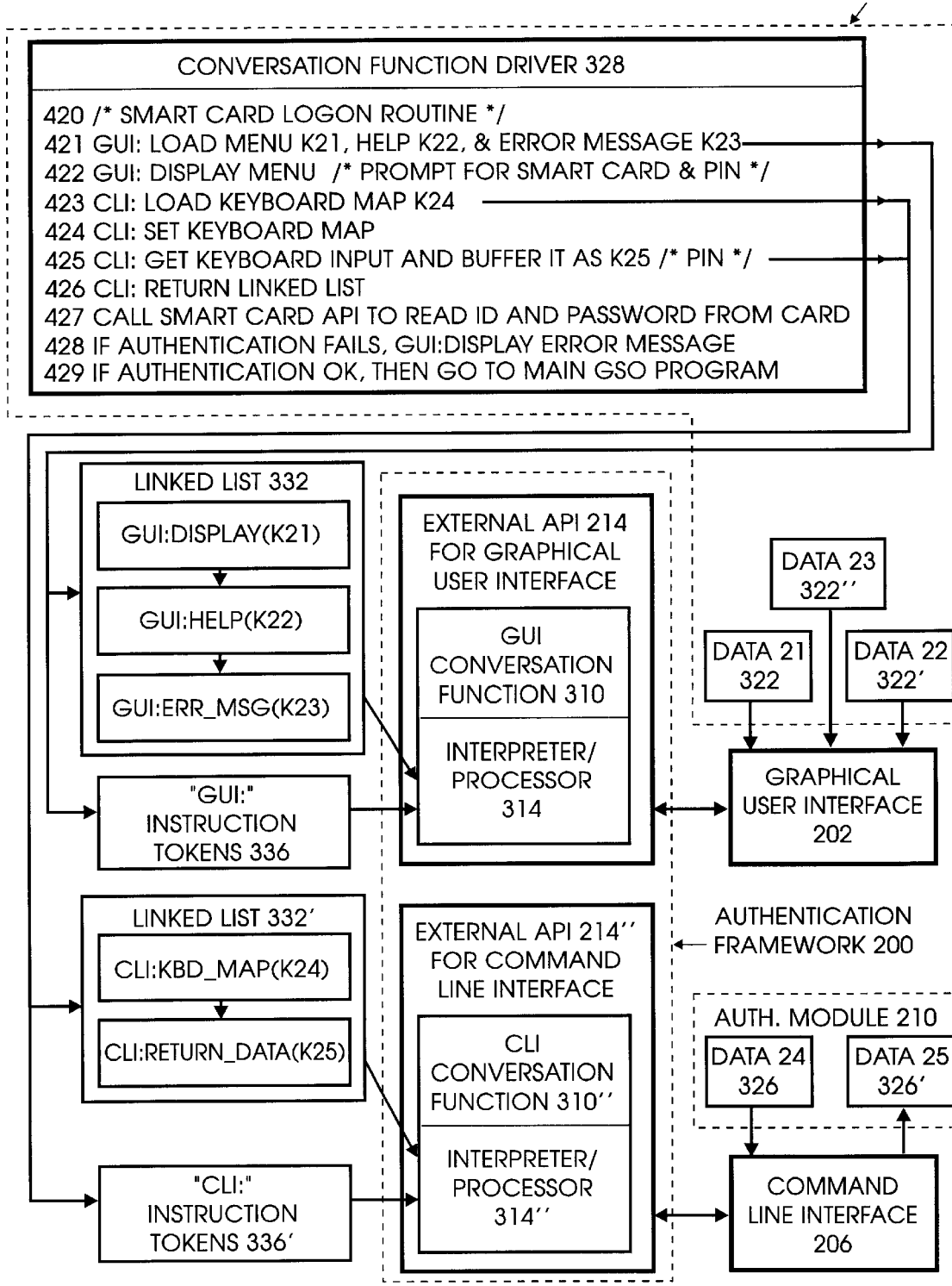
FIG. 3A illustrates the data flow paths between the smart card authentication module 210 and the external API 214 for the graphical user interface 202 and with the external API 214" for the command line interface 206.

FIG. 3A is similar to FIG. 3 except that it applies to the smart card authentication module 210. The conversation driver 328 in the smart card authentication module 210, has a different set of instructions which characterize authentication processes for a smart card, as opposed to the user ID/password process described in FIG. 3. FIG. 3A shows that the instruction 420 of the conversation function driver 328 is a comment. Instructions 421 and 422 are GUI instructions which are converted by conversation function driver 328 into GUI instruction tokens 336 which are sent to the external API 214 for a graphical user interface to be interpreted by the interpreter processor 314 and applied to the GUI conversation function 310. Instructions 423, 424, 425 and 426 of the conversation function driver 328, are CLI instructions which are converted by the conversation function driver 328 into CLI instruction tokens 336' which are sent to the external API 214" for command line interface, to be interpreted by the interpreter processor 314" and applied to the CLI conversation function 310". Instruction 427 calls a smart card API to read the ID and password from the smart card 222. Instructions 428 and 429 are logical instructions that test the authentication and if the authentication fails, a GUI instruction token is formed by the conversation function driver 328 to cause a display error message to be displayed by the display 203. If the authentication is OK, then the conversation function driver 328 goes to the main system program. The graphical user interface 202 is seen in FIG. 3A to use the key values provided in the linked lists 332 to access data 21, (322) the data 23, (322") and the data 22, (322') from the database of the smart card authentication module 210 shown in FIG. 2A. A similar operation obtains for the command line interface 206 as shown in FIG. 3A.

Figure 3B:
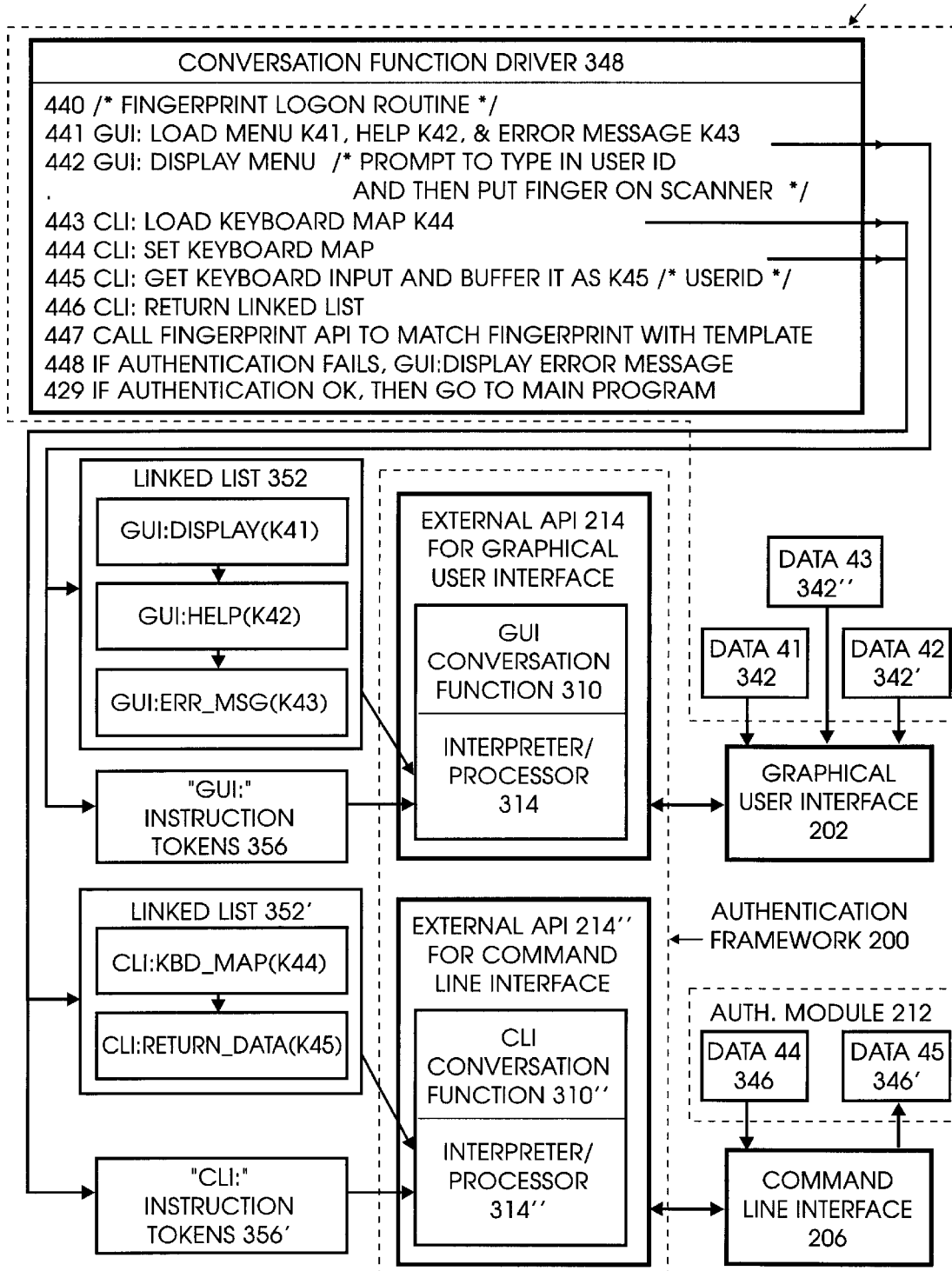
FIG. 3B illustrates the data flow paths between the fingerprint authentication module 212 and the external API 214 for the graphical user interface 202 and with the external API 214" for the command line interface 206.

FIG. 3B is similar to FIG. 3 except that it applies to the fingerprint authentication module 212. The conversation driver 348 in the fingerprint authentication module 212, has a different set of instructions which characterize authentication processes for a fingerprint scanner, as opposed to the user ID/password process described in FIG. 3. FIG. 3B shows that the instruction 440 of the conversation function driver 348 is a comment. Instructions 441 and 442 are GUI instructions which are converted by conversation function driver 348 into GUI instruction tokens 356 which are sent to the external API 214 for a graphical user interface to be interpreted by the interpreter processor 314 and applied to the GUI conversation function 310. Instructions 443, 444, 445 and 446 of the conversation function driver 348, are CLI instructions which are converted by the conversation function driver 348 into CLI instruction tokens 356' which are sent to the external API 214" for command line interface, to be interpreted by the interpreter processor 314" and applied to the CLI conversation function 310". Instruction 447 calls a fingerprint API to match the scanned fingerprint from the scanner 224 with a stored template replica of the authentic user's fingerprint. Instructions 448 and 449 are logical instructions that test the authentication and if the authentication fails, a GUI instruction token is formed by the conversation function driver 348 to cause a display error message to be displayed by the display 203. If the authentication is OK, then the conversation function driver 348 goes to the main system program. The graphical user interface 202 is seen in FIG. 3B to use the key values provided in the linked lists 352 to access data 41, (342) the data 43, (342") and the data 42, (342') from the database of the fingerprint authentication module 212 shown in FIG. 2B. A similar operation obtains for the command line interface 206 as shown in FIG. 3B.

In the alternate embodiments of the invention where authentication modules such as module 212 implement other types of biometric authentication processes, such as iris and retinal scanning, voice print scanning, hand and face geometry scanning, body odor profiling, vein scanning, or signature recognition, and the like, FIG. 3B illustrates the principles of operation of such other types of biometric authentication modules 212.

FIG. 4 illustrates the dataflow path for interprocess communications (IPC) messages for the linked list 312, for the GUI instruction tokens, and for the display data, going from the user ID/password authentication module 208 of FIG. 3 to the GUI conversation function 310. FIG. 4 shows the IPC message 434 which includes a header 432, which indicates that its going to the GUI API and is coming from the user ID/password authentication module. The message 434 includes the linked list 312 which is provided to the GUI conversation function 310. FIG. 4 also shows the IPC messages 436 which are the GUI instruction tokens 316 from the driver 308 provided to the GUI conversation function 310. The GUI conversation function 310 is a program sequence and instructions which carries out the generic graphical user interface routine and is responsive to instruction tokens from the authentication modules 210,208, and 212. Instructions 450 and 451 are comments. Instruction 452 causes the external API 214 for graphical user interface to buffer the key values from the linked list 312, where the requesting module is the user ID/password authentication module 208. The instructions 453, 454 and 456 are generic instructions that operate on a GUI instruction token 316 with an op code "load menu". If the op code is "load menu", then the GUI conversation function 310 gets menu data from the requesting module at the named key value and it loads the menu data into the menu buffer of the external API 214 for the graphical user interface. Similarly, instructions 457, 458 and 460 operate on a GUI instruction token having an op code "load help". Instructions 461, 462, and 464 operate on a GUI instruction token with an op code "load error message". The instructions 465, 466 and 468 operate GUI instruction tokens with op codes of "display menu", "display error message", or "display help" to display either menu data, error data, or help data, respectively.

FIG. 4A is similar to FIG. 4, except that it applies to receiving GUI instruction tokens 336 from the smart card authentication module 210. The IPC message 434' shown in FIG. 4A, is from the smart card authentication module and contains a linked list 332 from the smart card authentication module 210. The IPC messages 436' are the GUI instruction tokens 336 from the smart card authentication module 210 of FIG. 3A. However, in accordance with the invention, the GUI conversation function 310 shown in FIG. 4A, is the same as that shown in FIG. 4 for the GUI instruction tokens received from the user ID/password authentication module 208.

Figure 4B:
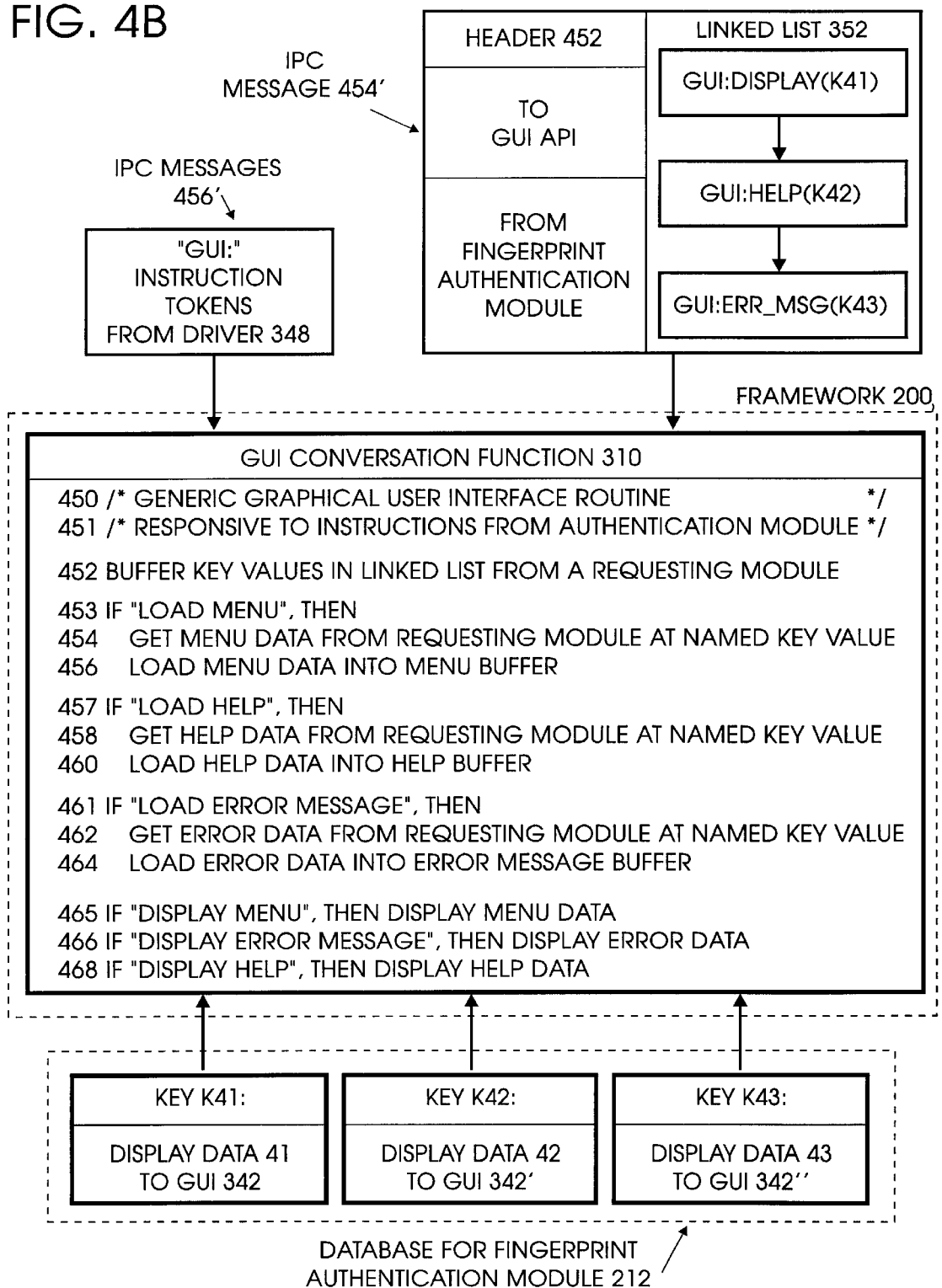
FIG. 4B illustrates the data flow paths for interprocess communications (IPC) messages for the linked list 352, for the GUI instruction tokens, and for the display data, going from the fingerprint authentication module 212 of FIG. 3B to the GUI conversation function 310.

FIG. 4B is similar to FIG. 4, except that it applies to receiving GUI instruction tokens 356 from the fingerprint authentication module 212. The IPC message 454' shown in FIG. 4B, is from the fingerprint authentication module and contains a linked list 352 from the fingerprint authentication module 212. The IPC messages 456' are the GUI instruction tokens 356 from the fingerprint authentication module 212 of FIG. 3B. However, in accordance with the invention, the GUI conversation function 310 shown in FIG. 4B, is the same as that shown in FIG. 4 for the GUI instruction tokens received from the user ID/password authentication module 208.

In the alternate embodiments of the invention where authentication modules such as module 212 implement other types of biometric authentication processes, such as iris and retinal scanning, voice print scanning, hand and face geometry scanning, body odor profiling, vein scanning, or signature recognition, and the like, FIG. 4B illustrates the principles of operation of such other types of biometric authentication modules 212.

Figure 5B:
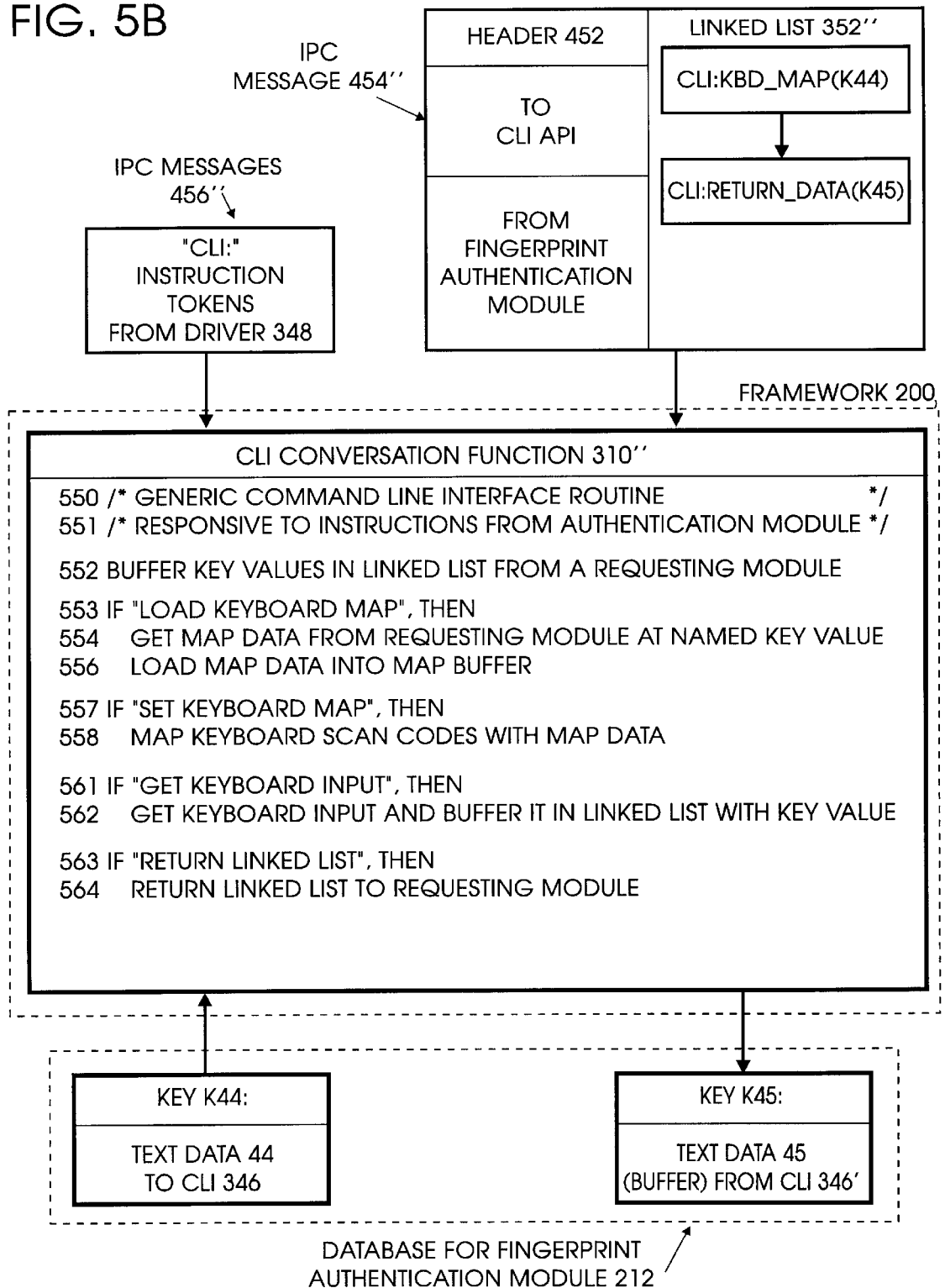
FIG. 5B illustrates the data flow paths for interprocess communications (IPC) messages for the linked list 352", for the GUI instruction tokens, and for the text data, going from the fingerprint authentication module 212 of FIG. 3B to the CLI conversation function 310".

FIGS. 5, 5A and 5B are similar to FIGS. 4, 4A and 4B, respectively, except that they apply to the command line interface 206. FIG. 5 illustrates the dataflow paths for interprocess communications (ICP) messages for the linked list 312", for the CLI instruction tokens, and for text data going from the user ID/password authentication module 208 of FIG. 3 to the command line interface (CLI) conversation function 310". FIG. 5 shows the IPC message 434''' which includes a header 432 which indicates that the message is to the CLI API 214" and it is from the user ID/password authentication module 208. The IPC messages 436''' are the CLI instruction tokens 316' from the user ID/password authentication module 208. The CLI conversation function 310" shown in FIG. 5, is a sequence of generic instructions which characterize the command line interface routine and which is responsive to CLI instruction tokens from the authentication modules 210, 208 and 212. Instructions 550 and 551 are comments. Instruction 552 causes the external API 214" for command line interface to buffer the key values from the linked list 312', if the requesting module is user ID/password authentication module 208. Instructions 553, 554 and 556 operate on a CLI instruction token 216' having an op code "load keyboard map", to get map data from the requesting module at the named key value and load the map data into the map buffer of the external API 214" for command line interface. Instructions 557 and 558 operate on CLI instruction tokens 316' having an op code "set keyboard map", which then maps the keyboard scan codes with the map data. Instructions 561 and 562 operate on CLI instruction token 316' with an op code "get keyboard input" and then gets the keyboard input from the command line interface 206 and buffers it in the available buffer space in the linked list 312' associated with the key value, for example K5, in the CLI instruction token. Instructions 563 and 564 operate on a CLI instruction 316' with an op code "return linked list" to return the linked list to the requesting module.

FIG. 5A is similar to FIG. 5 except that it applies to CLI instruction tokens 336' received from the smart card authentication module 210. The IPC message 434" includes the linked list 332" from the smart card authentication module. The IPC messages 436" include the CLI instruction tokens 336' from the smart card authentication module 210. However, in accordance with the invention, the CLI conversation function 310" in FIG. 5A is the same as that shown in FIG. 5 for operations associated with the user ID/password authentication module 208.

FIG. 5B is similar to FIG. 5 except that it applies to CLI instruction tokens 356' received from the fingerprint authentication module 212. The IPC message 454" includes the linked list 352" from the fingerprint authentication module. The IPC messages 456" include the CLI instruction tokens 356' from the fingerprint authentication module 212. However, in accordance with the invention, the CLI conversation function 310" in FIG. 5B is the same as that shown in FIG. 5 for operations associated with the user ID/password authentication module 208.

In the alternate embodiments of the invention where authentication modules such as module 212 implement other types of biometric authentication processes, such as iris and retinal scanning, voice print scanning, hand and face geometry scanning, body odor profiling, vein scanning, or signature recognition, and the like, FIG. 5B illustrates the principles of operation of such other types of biometric authentication modules 212.

Figure 6:
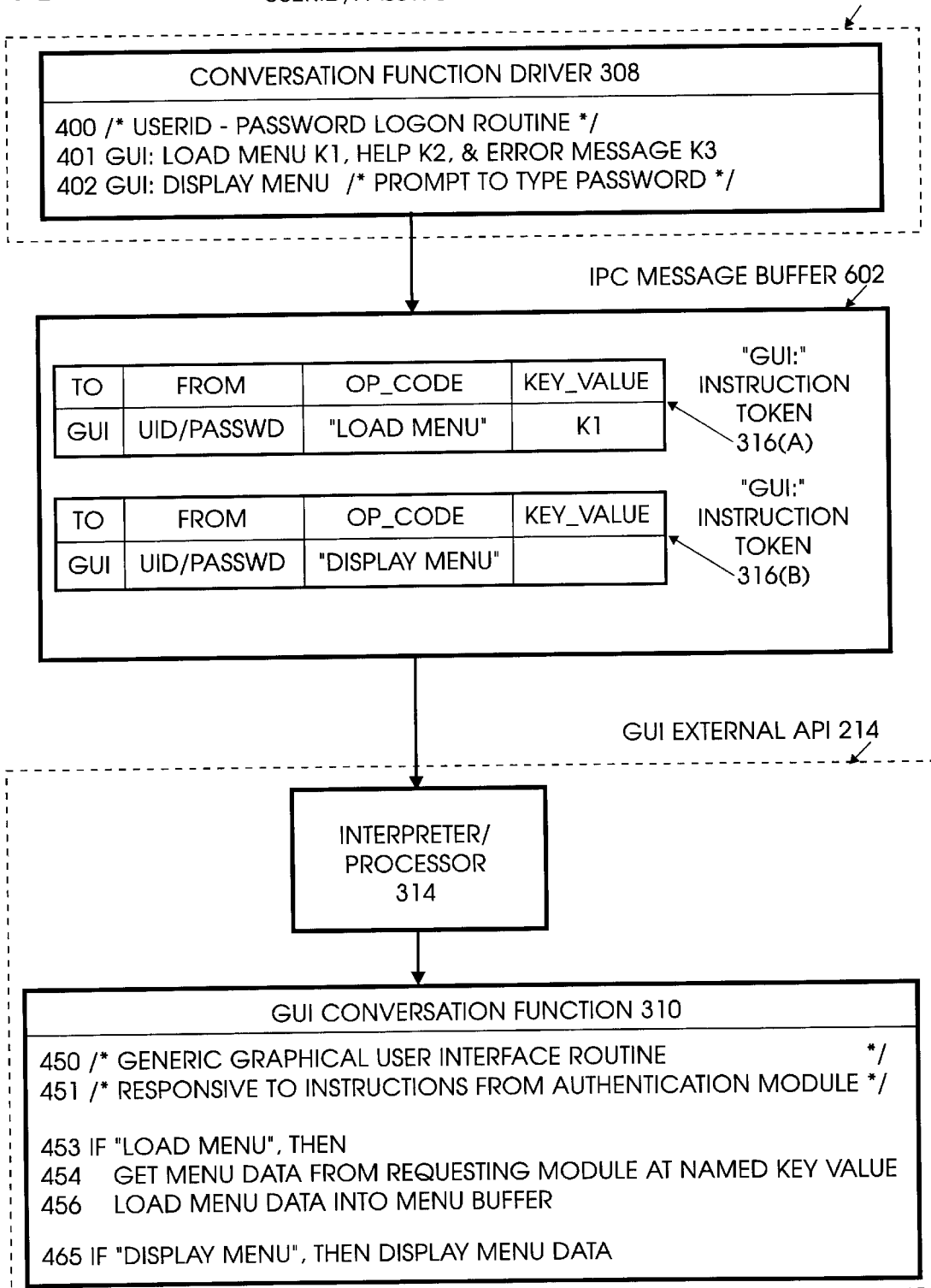
FIG. 6 illustrates the data flow paths for interprocess communications (IPC) messages for the GUI instruction tokens 316 going from the userid/password authentication module 208 of FIG. 3 to the conversation function 310 of the GUI external API 214.

FIG. 6 illustrates the dataflow paths for interprocess communications (IPC) messages for the GUI instruction tokens 316 going from the user ID/password authentication module 208 of FIG. 3 to the conversation function 310 of the GUI external API 214. As is seen in FIG. 6, GUI instruction tokens 316(A) and 316(B) are formed by the conversation function driver 308 and are buffered in the IPC message buffer 602. The GUI instruction token 316(A) includes four fields, a destination field to the GUI, a sender field from the user ID/password authentication module 208, an op code field designating op codes such as "load menu" or "display menu", and a key value field for the key value corresponding to the data which is the operand for the op code, that data being stored in the database of the user ID/password authentication module 208. As is seen in FIG. 6, the IPC message buffer 602 passes the GUI instruction codes 316 to the GUI external API 214 where they are interpreted in the interpreter processor 314 and are applied to the GUI conversation function 310.

Figure 6A:
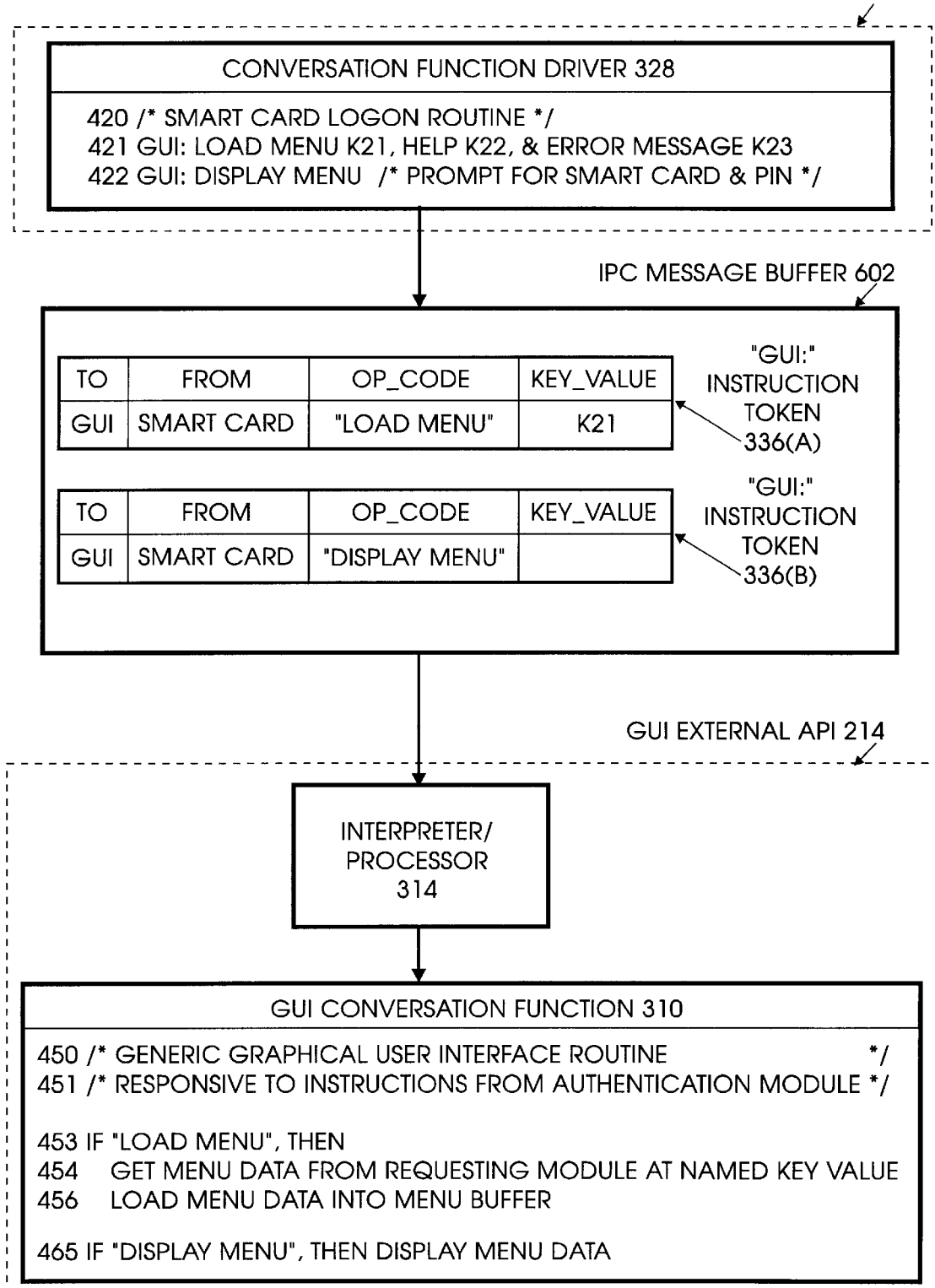
FIG. 6A illustrates the data flow paths for interprocess communications (IPC) messages for the GUI instruction tokens 336 going from the smart card authentication module 210 of FIG. 3A to the conversation function 310 of the GUI external API 214.

FIG. 6A is similar to FIG. 6, except that it applies to GUI instruction tokens 336 from the smart card authentication module 210 which are buffered in the IPC message buffer 602 and then applied to the GUI external API 214 in a manner similar to that described for FIG. 6.

Figure 6B:
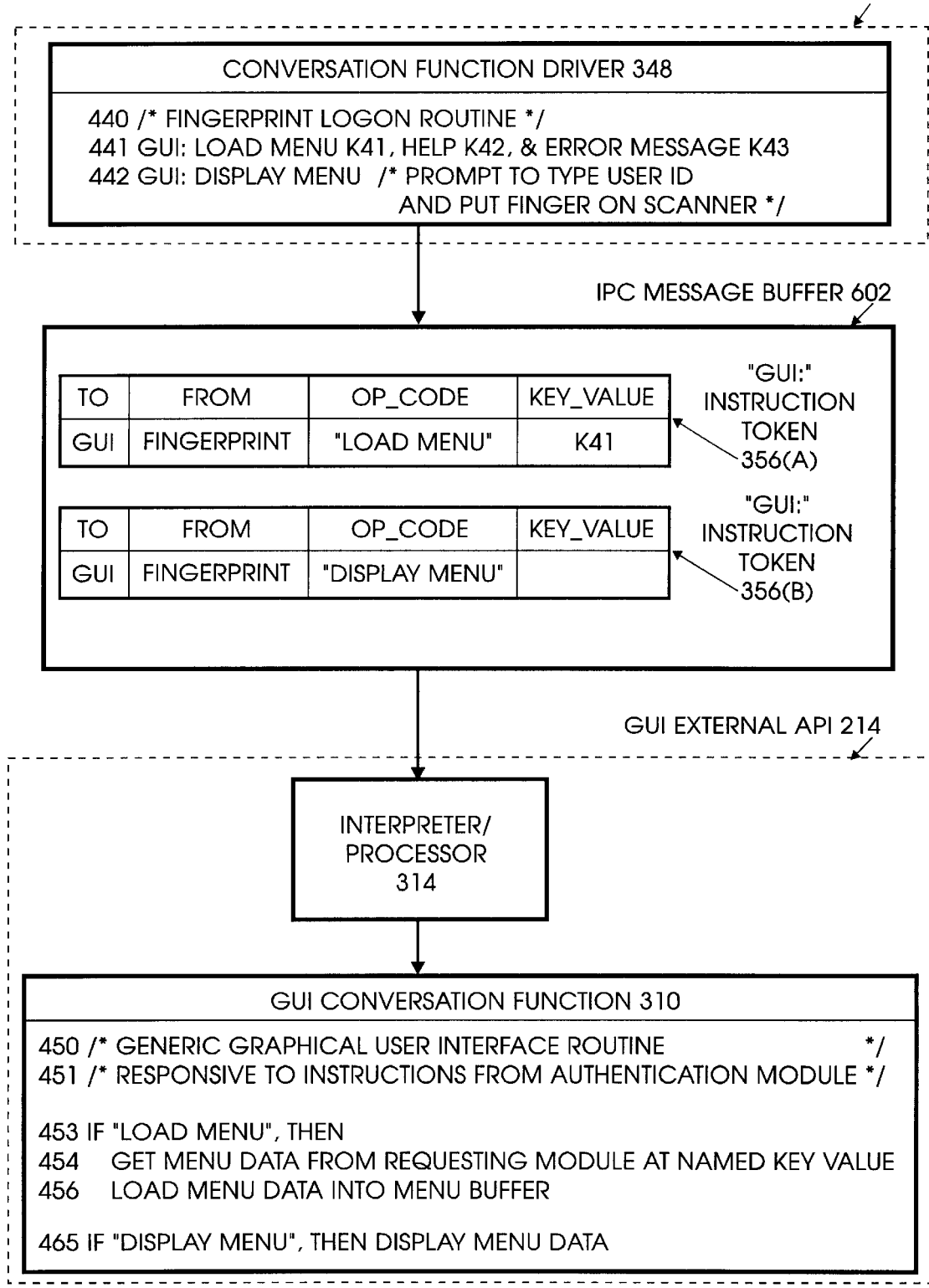
FIG. 6B illustrates the data flow paths for interprocess communications (IPC) messages for the GUI instruction tokens 356 going from the fingerprint authentication module 212 of FIG. 3B to the conversation function 310 of the GUI external API 214.

FIG. 6B is similar to FIG. 6, except that it applies to GUI instruction tokens 356 from the fingerprint authentication module 212 which are buffered in the IPC message buffer 602 and then applied to the GUI external API 214 in a manner similar to that described for FIG. 6.

In the alternate embodiments of the invention where authentication modules such as module 212 implement other types of biometric authentication processes, such as iris and retinal scanning, voice print scanning, hand and face geometry scanning, body odor profiling, vein scanning, or signature recognition, and the like, FIG. 6B illustrates the principles of operation of such other types of biometric authentication modules 212.

Figure 7:
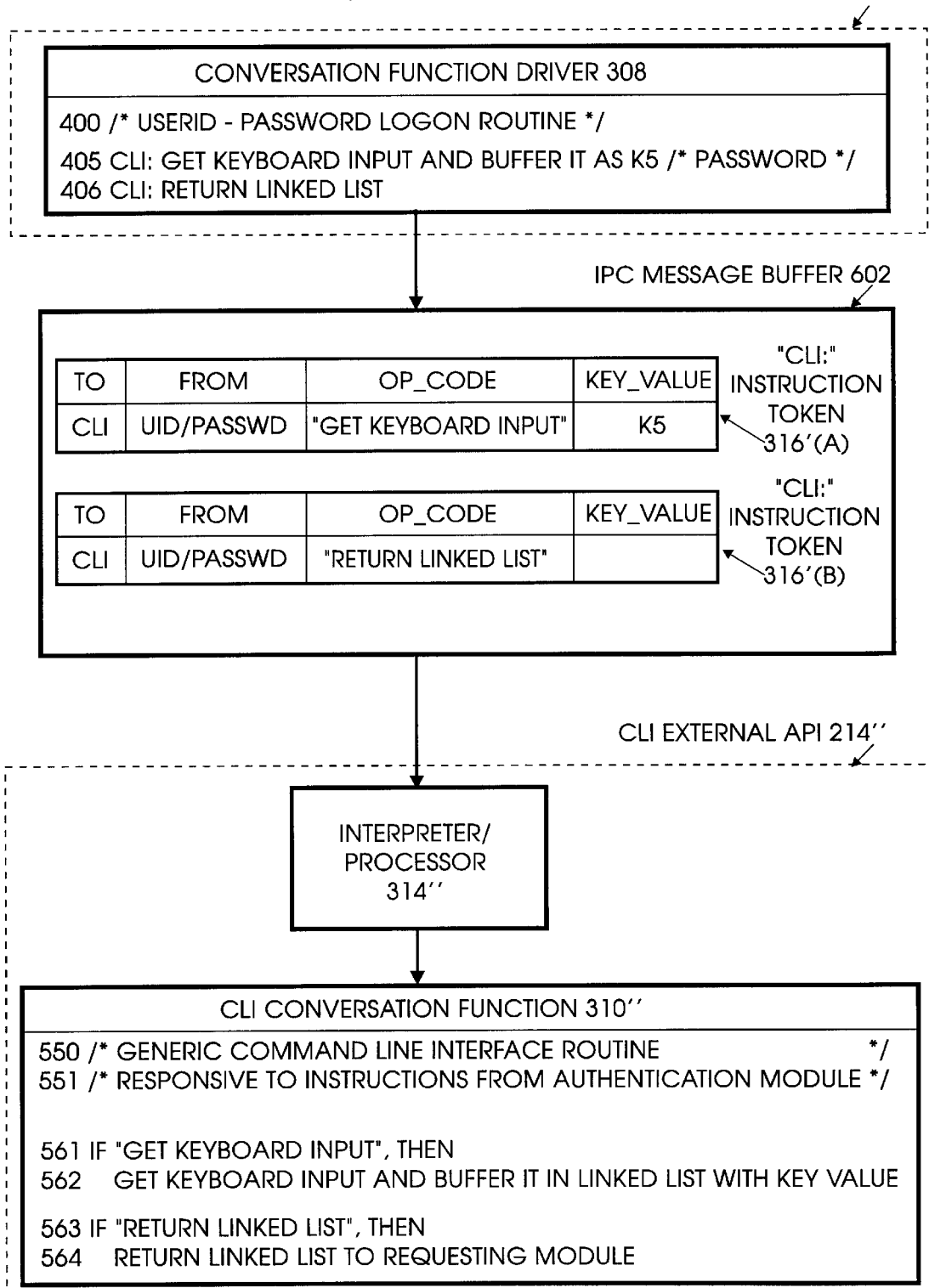
FIG. 7 illustrates the data flow paths for interprocess communications (IPC) messages for the CLI instruction tokens 316' going from the userid/password authentication module 208 of FIG. 3 to the conversation function 310" of the CLI external API 214".
Figure 7B:
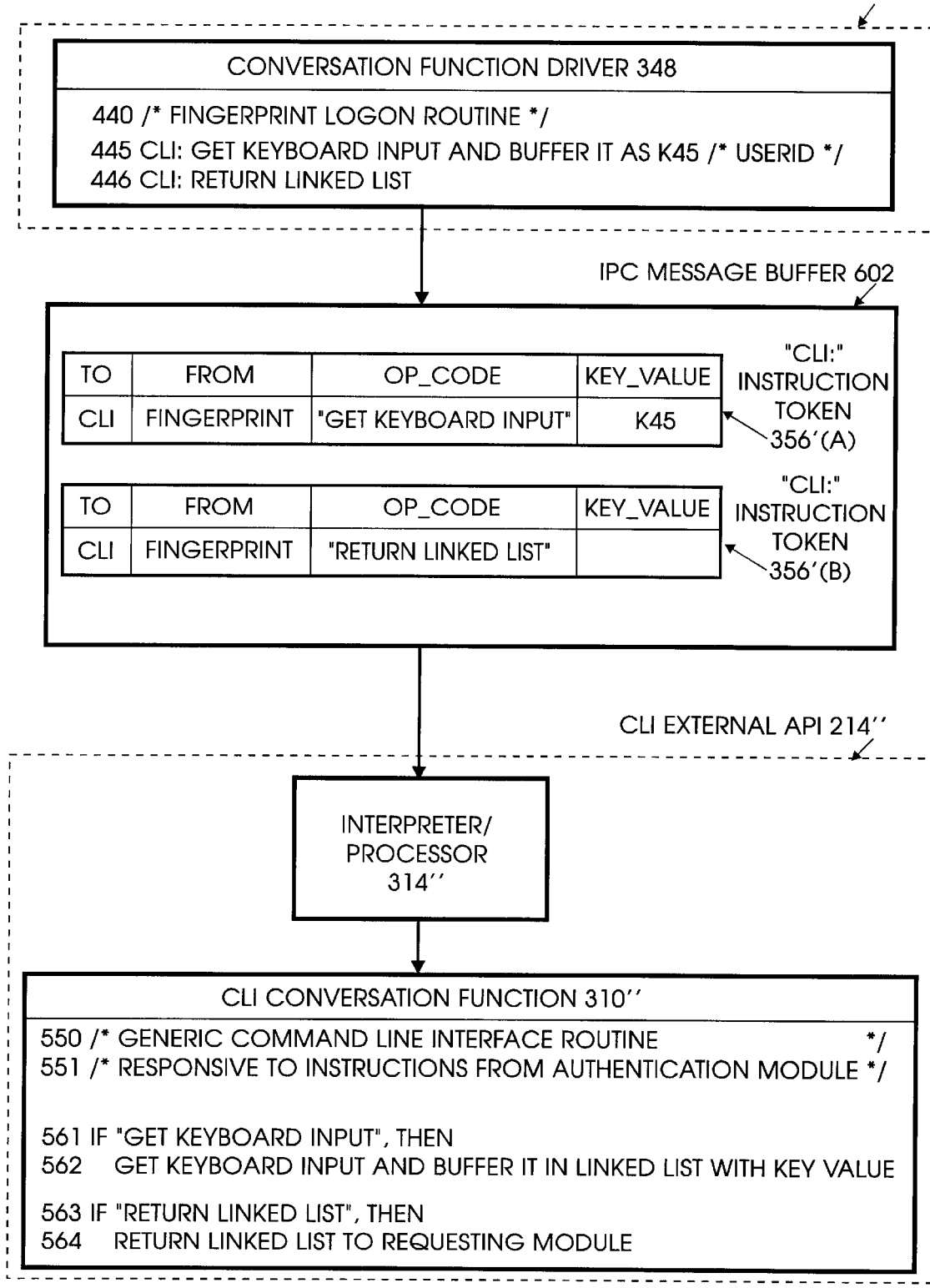
FIG. 7B illustrates the data flow paths for interprocess communications (IPC) messages for the CLI instruction tokens 356' going from the fingerprint authentication module 212 of FIG. 3B to the conversation function 310" of the CLI external API 214".
Figure 8:
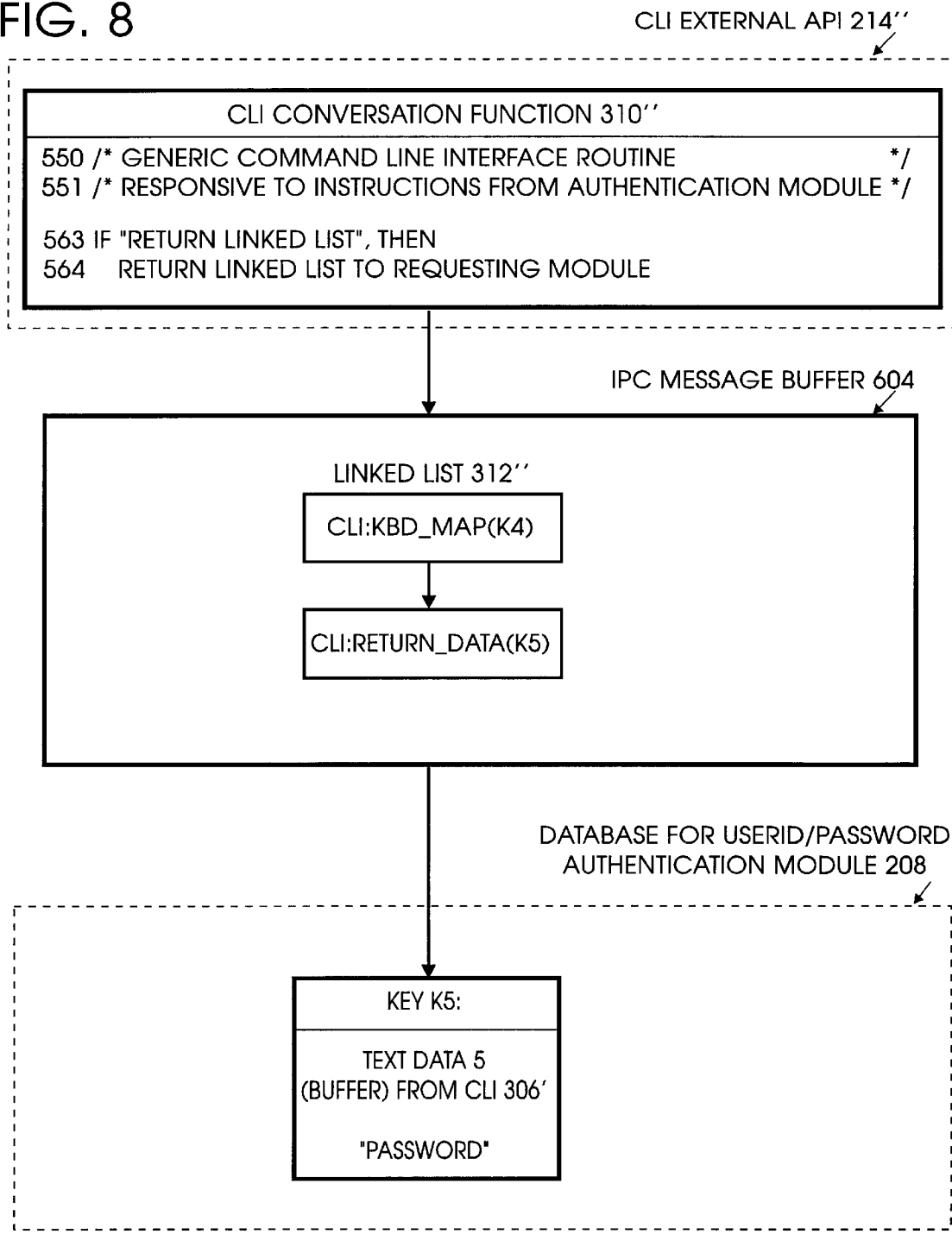
FIG. 8 illustrates the data flow paths for interprocess communications (IPC) messages for the linked list 312" going to the userid/password authentication module 208 of FIG. 3 from the conversation function 310" of the CLI external API 214".
Figure 8A:
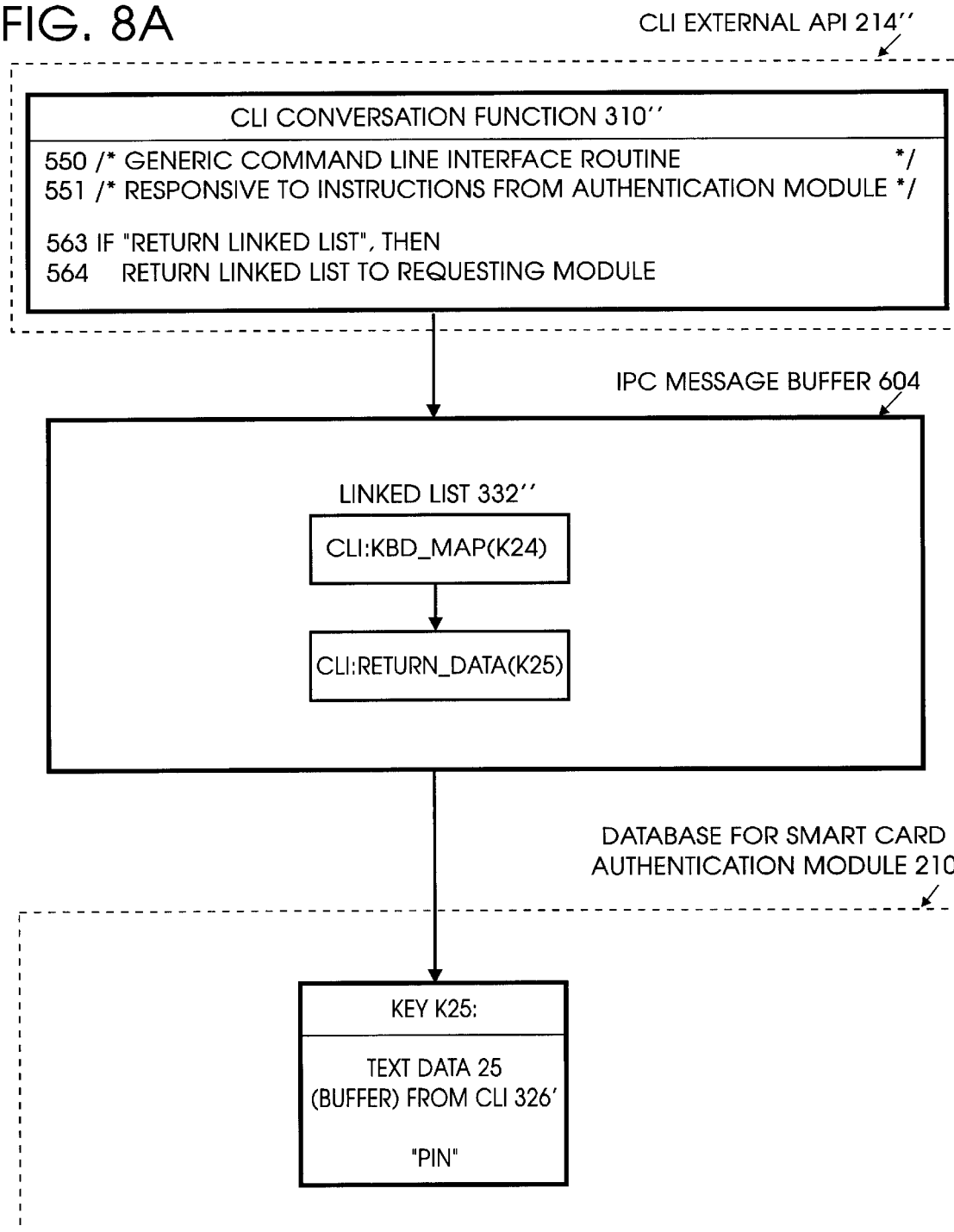
FIG. 8A illustrates the data flow paths for interprocess communications (IPC) messages for the linked list 332" going to the smart card authentication module 210 of FIG. 3A from the conversation function 310" of the CLI external API 214".
Figure 8B:
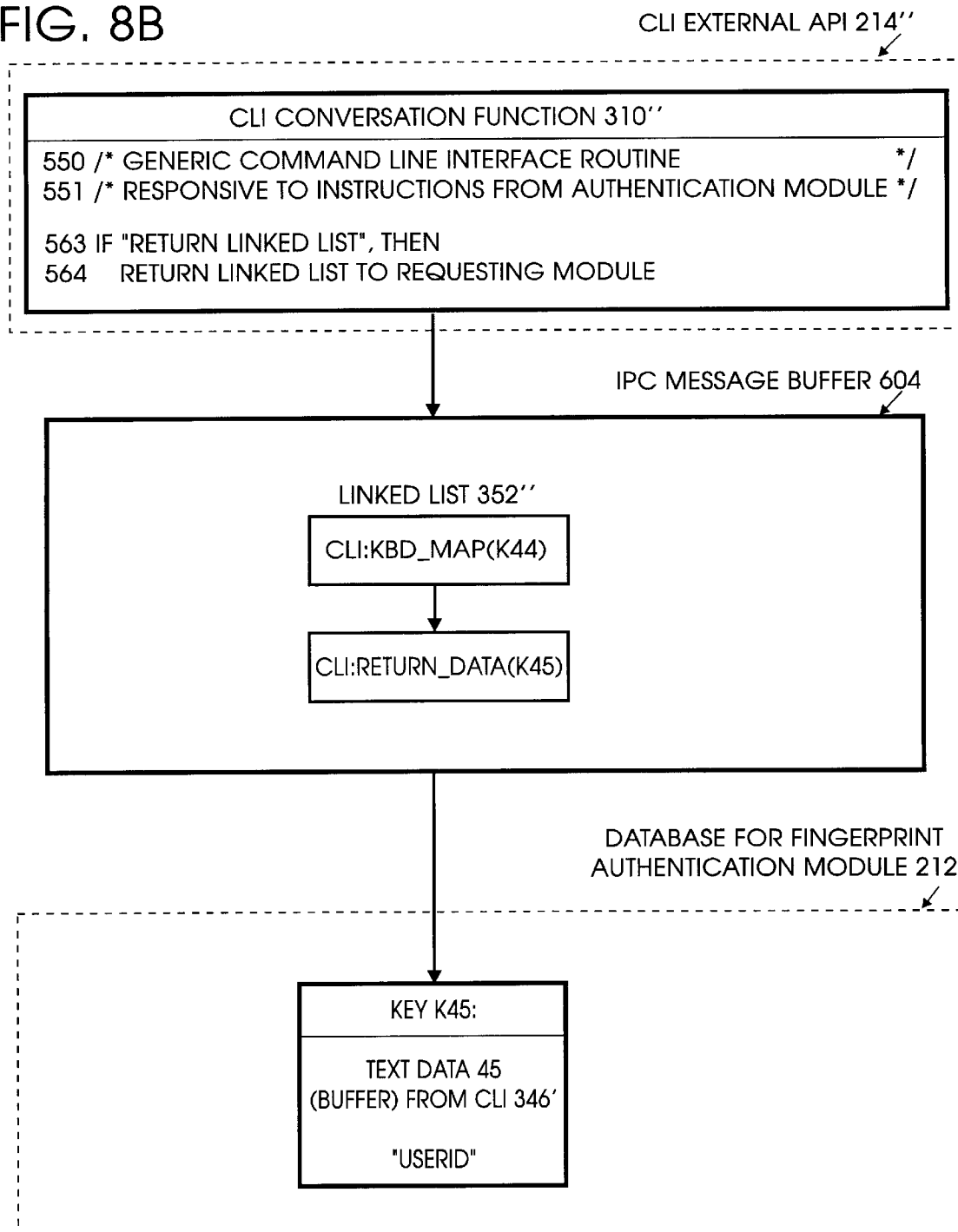
FIG. 8B illustrates the data flow paths for interprocess communications (IPC) messages for the linked list 352" going to the fingerprint authentication module 212 of FIG. 3B from the conversation function 310" of the CLI external API 214".

FIGS. 7, 7A and 7B are similar to FIGS. 6, 6A and 6B, respectively, except that they apply to the command line interface (CLI) conversation function 310". FIGS. 8, 8A and 8B illustrate the dataflow paths for interprocess communications messages for the linked list 312", 332", and 352", respectively, going back to the authentication module from the conversation function 310" of the CLI external API 214". FIG. 8 shows the IPC message buffer 604 passing the linked list 312", for example, to the authentication module 208, to return "PASSWORD" to the authentication module for the key value K5. FIG. 8A shows the return of "PIN" to the smart card authentication module 210 for the key value K25. FIG. 8B shows the return of "USERID" to the fingerprint authentication module 212 for the key value K45.

In the alternate embodiments of the invention where authentication modules such as module 212 implement other types of biometric authentication processes, such as iris and retinal scanning, voice print scanning, hand and face geometry scanning, body odor profiling, vein scanning, or signature recognition, and the like, FIGS. 7B and 8B illustrate the principles of operation of such other types of biometric authentication modules 212.

FIG. 9 is a functional block diagram of the user's processor 900, programmed in accordance with the invention to selectively provide several types of user authentication mechanisms and processes. The CPU processor 908 executes the instructions in the programs stored in memory 902, to perform the functions and methods of the invention.

Application of the invention to Global Sign-On

In a distributed system environment consisting of many PC networks, mainframes and minicomputers connected by networks, a user must access many database systems, network systems, operating systems and mainframe applications. In order to use these systems and applications, the user must typically issue a separate sign-on command for each specific system or application. Each of these sign-ons may, in turn, have a different pair of user ids and passwords. This requirement places the user under a significant burden to remember and maintain this information.

This problem has been addressed by the single sign-on (SSO) invention disclosed in the above-referenced patent applications. The single sign-on feature enables authorized users to perform one initial sign-on to access a variety of networks, systems and applications. An implementation of the single sign-on invention is in the IBM Global Sign-On (GSO) product which was announced on Aug. 31, 1998.

IBM's Global Sign-On (GSO) product stores all the passwords and keys belonging to a user in secure storage, so that the user needs to remember only one ID and password. The single GSO ID and password is then used to authenticate the user. Upon authentication, GSO securely retrieves all the passwords for a user from the secure storage and automatically (without any additional user intervention) issues sign-ons to each application the user is authorized to access. Conceptually, this is like putting all the passwords of a user in a "key box" or safe deposit box which is kept and maintained securely by a centralized authority. The only key kept by the user is the one used to open the user's key box (this key is called the GSO password). The user needs only that one key to open the key box (in fact, the box opening operation is performed by the authority) in order to get all the other keys, and the authority is responsible for giving all the user's keys back to the user in a secure way ("secure" here means both data confidentiality and data integrity).

An example of the steps for logon to the GSO Single Sign-On System follows:

a. The user can initiate a session by an input to the user's PC keyboard.

b. The type of authentication is governed by the requirements of the PC operating system, which could be password, smart card, or fingerprint authentication.

c. Assume that a smart card authentication is required by the operating system.

d. The Authentication Framework's conversation function in the GUI API is controlled by the conversation function driver in the smart card authentication module to display the sign-on dialog on the display screen. This dialog asks the user to plug in his smart card and to type in his PIN number.

e. The Authentication Framework's conversation function in the CLI API is controlled by the conversation function driver in the smart card authentication module to return the user PIN number typed in at the keyboard, to the smart card authentication module.

f. The smart card, itself, stores the GSO user ID and the GSO user password. The smart card authentication module returns the typed PIN number to the smart card. If the PIN number is correct, then the smart card returns the GSO user ID and the GSO user password. This provides a two factor authentication of the user, requiring possession of the smart card by the user and knowledge of the PIN number.

g. The Authentication Framework's conversation function in the Local/Network API is controlled by the conversation function driver in the smart card authentication module to transmit the GSO user ID and the GSO user password as the user's credentials to the GSO Personal Key Manager, as described in the above cited patent applications.

h. GSO Personal Key Manager contains information about users, systems, and passwords they must use to logon to those systems. The GSO Personal Key Manager responds to the receipt of the user's credentials from the authentication framework, by enabling the GSO logon coordinator, described in the above cited patent applications, to sign-on to various target systems and applications, bases on the targets' own protocols and mechanisms.

IBM's Global Sign-On solution consists of the following major components:

GSO Authentication Framework 200 - Authenticates the user to the GSO system. On systems with local operating system security, this authentication mechanism is integrated with the local OS authentication. This component is specifically designed to handle "snapping in" different authentication mechanisms (e.g. secret key, smart cards, flat files, public/private key), as discussed above.

Configuration Information Manager (CIM)—Contains information on how to logon to the applications configured on a given machine. This component provides the ability to add new logon methods as needed.

Personal Key Manager (PKM)—Contains information about users, systems and passwords they use to logon to those systems. Since this information is centralized, users can access their resources with one sign-on from any workstation and manage their passwords from this one repository.

Logon Coordinator (LC)—Retrieves the user's passwords from PKM and uses them in conjunction with the target specific logon code to log users onto all their systems without any additional user intervention.

Additionally, this solution has a complete set of graphical and command line interfaces to manage the GSO information in an easy fashion. The solution also supports a template mechanism to specify how to logon to a given application. This makes it very easy to extend the list of supported systems and applications. The expected runtime flow of a user interacting with Global Sign-On is as follows. First, a GSO user either logs in to a local operating system (if required by the local operating system) or logs on via the GSO logon interface (if local logon is not required by the operating system). Then, the user's local logon enables the GSO Authentication Framework 200 on the local machine to authenticate the user to the authentication service that is integrated with the password storage service. A successful authentication triggers the GSO Graphical User Interface (GUI) which will be used to display the systems/applications the user is able to logon to and the status of the logon process. The GSO GUI calls the Logon Coordinator on the local machine to retrieve the user's configuration information and target configuration information. The Logon Coordinator gets the user's information (which target systems and applications the user can sign-on to) and the passwords and keys for those systems/applications from the Personal Key Manager. If the Personal Key Manager is implemented as a remote service, the Personal Key Manager client gets the information in a secure fashion (i.e., the passwords/keys are encrypted for transmission). The credentials returned from the GSO Authentication Framework 200 are used by the Personal Key Manager client to ensure that the user who logged on to GSO is the user who retrieves the passwords. Then, the Logon Coordinator uses these passwords/keys and the target logon information found in the Configuration Information Manager to sign-on to various target systems and applications, based upon the targets' own protocols and mechanisms. The Logon Coordinator provides status information about the state of the logons and also allows some targets to be launched asynchronously (after the initial GSO processing has completed).

The secrecy of passwords and keys transmitted across networks can be achieved by utilizing the authentication and message encryption functions provided by security services such as DCE's Kerberos or NetSP's KryptoKnight. To make the single sign-on (SSO) components portable to different security environments, the design and implementation of the SSO components should be independent of the underlying authentication protocols and encryption mechanisms. This is made possible by the Authentication Framework 200, described above.

Although specific embodiments of the invention have been disclosed, it will be understood by those skilled in the art that changes can be made to those specific embodiments without departing from the spirit and the scope of the invention.

What is claimed is:

1. An authentication subsystem for enabling a computer system to authenticate a user with a selected one of a plurality of authentication processes, each having a distinct sequence of steps and a unique input/output (I/O) interface for exchanging authentication information with the computer system, comprising:

a first conversation function driver coupled to a first authentication module, defining a first programmed sequence of steps to authenticate a user with a first authentication process, said first driver having access to first display configuration information and first input device configuration information used during said first authentication process, to configure a user display and input device for the first authentication process;

a second conversation function driver coupled to a second authentication module, defining a second programmed sequence of steps to authenticate a user with a second authentication process, said second driver having access to second display configuration information and second input device configuration information used during said second authentication process, to configure the user display and input device for the second authentication process;

an authentication framework in the computer system; and a generic conversation function including an interpreter/processor in the authentication framework coupled to the user display and input device, defining a generic programmed sequence of steps for selectively re-configuring the user display and input device layouts and a command line interface in response to said first programmed sequence of steps or said second programmed sequence of steps;

said generic conversation function receiving said first programmed sequence of steps from the first conversation driver, to selectively re-configure the user display and input device for authenticating a user during the first authentication process;

said generic conversation function receiving said second programmed sequence of steps from the second conversation driver, to selectively re-configure the user display and input device for authenticating a user during the second authentication process.

2. The authentication subsystem of claim 1, wherein said first authentication process is selected from the group consisting of a userid/password authentication process, a smart card authentication process, a fingerprint authentication process, a biometric authentication process, a voice print scanning authentication process, a hand and face geometry scanning authentication process, a body odor profiling authentication process, a vein scanning authentication process, and a signature recognition authentication process.

3. The authentication subsystem of claim 2, wherein said second authentication process is selected from the group consisting of a userid/password authentication process, a smart card authentication process, a fingerprint authentication process, a biometric authentication process, a voice print scanning authentication process, a hand and face geometry scanning authentication process, a body odor profiling authentication process, a vein scanning authentication process, and a signature recognition authentication process.

4. The authentication subsystem of claim 1, wherein said display device includes a graphical user interface.

5. The authentication subsystem of claim 1, wherein said display device includes a command line interface.

6. The authentication subsystem of claim 1, wherein said input device is a keyboard.

7. The authentication subsystem of claim 1, wherein said first authentication module provides credentials derived from authentication to a single sign-on system.

8. An authentication method for enabling a computer system to authenticate a user with a selected one of a plurality of authentication processes, each having a distinct sequence of steps and a unique input/output (I/O) interface for exchanging authentication information with the computer system, comprising:

defining a first programmed sequence of steps in a first conversation function driver coupled to a first authentication module, to authenticate a user with a first authentication process, said first driver having access to first display configuration information and first input device configuration information used during said first authentication process, to configure a user display and input device for the first authentication process;

defining a second programmed sequence of steps in a second conversation function driver coupled to a second authentication module, to authenticate a user with a second authentication process, said second driver having access to second display configuration information and second input device configuration information used during said second authentication process, to configure the user display and input device for the second authentication process; and defining a generic programmed sequence of steps in a generic conversation function including an interpreter/processor in an authentication framework coupled to the user display and input device, for selectively re-configuring the user display and input device layouts and a command line in response to said first programmed sequence of steps or said second programmed sequence of steps;

said generic conversation function receiving said first programmed sequence of steps from the first conversation driver, to re- configure the user display and input device for authenticating a user during the first authentication process;

said generic conversation function receiving said second programmed sequence of steps from the second conversation driver, to re-configure the user display and input device for authenticating a user during the second authentication process.

9. The authentication method of claim 8, wherein said first authentication process is selected from the group consisting of a userid/password authentication process, a smart card authentication process, a fingerprint authentication process, a biometric authentication process, a voice print scanning authentication process, a hand and face geometry scanning authentication process, a body odor profiling authentication process, a vein scanning authentication process, and a signature recognition authentication process.

10. The authentication method of claim 9, wherein said second authentication process is selected from the group consisting of a userid/password authentication process, a smart card authentication process, a fingerprint authentication process, a biometric authentication process, a voice print scanning authentication process, a hand and face geometry scanning authentication process, a body odor profiling authentication process, a vein scanning authentication process, and a signature recognition authentication process.

11. The authentication method of claim 8, wherein said display device includes a graphical user interface.

12. The authentication method of claim 8, wherein said display device includes a command line interface.

13. The authentication method of claim 8, wherein said input device is a keyboard.

14. The authentication method of claim 8, wherein said first authentication module provides credentials derived from authentication to a single sign-on system.

15. A computer program product in a computer-readable medium for enabling a computer system to authenticate a user with a selected one of a plurality of authentication processes, each having a distinct sequence of steps and a unique input/output (I/O) interface for exchanging authentication information with the computer system, the computer program product comprising:

program code for defining a first programmed sequence of steps in a first conversation function driver coupled to a first authentication module, to authenticate a user with a first authentication process, said first driver having access to first display configuration information and first input device configuration information used during said first authentication process, to configure a user display and input device for the first authentication process;

program code for defining a second programmed sequence of steps in a second conversation function driver coupled to a second authentication module, to authenticate a user with a second authentication process, said second driver having access to second display configuration information and second input device configuration information used during said second authentication process, to configure the user display and input device for the second authentication process; and program code for defining a generic programmed sequence of steps in a generic conversation function including an interpreter/processor an authentication framework coupled to the user display and input device, for selectively re-configuring the user display and input device layouts and a command line in response to said first programmed sequence of steps or said second programmed sequence of steps;

said generic conversation function receiving said first programmed sequence of steps from the first conversation driver, to re-configure the user display and input device for authenticating a user during the first authentication process;

said generic conversation function receiving said second programmed sequence of steps from the second conversation driver, to re-configure the user display and input device for authenticating a user during the second authentication process.

16. The computer program product of claim 15, wherein said first authentication process is selected from the group consisting of a userid/password authentication process, a smart card authentication process, a fingerprint authentication process, a biometric authentication process, a voice print scanning authentication process, a hand and face geometry scanning authentication process, a body odor profiling authentication process, a vein scanning authentication process, and a signature recognition authentication process.

17. The computer program product of claim 16, wherein said second authentication process is selected from the group consisting of a userid/password authentication process, a smart card authentication process, a fingerprint authentication process, a biometric authentication process, a voice print scanning authentication process, a hand and face geometry scanning authentication process, a body odor profiling authentication process, a vein scanning authentication process, and a signature recognition authentication process.

18. The computer program product of claim 15, wherein said display device includes a graphical user interface.

19. The computer program product of claim 15, wherein said display device includes a command line interface.

20. The computer program product of claim 15, wherein said input device is a keyboard.

21. The computer program product of claim 15, wherein said first authentication module provides credentials derived from authentication to a single sign-on system.

* * * * *